US007023817B2

(12) United States Patent
Kuffner et al.

(10) Patent No.: US 7,023,817 B2
(45) Date of Patent: Apr. 4, 2006

(54) METHOD AND APPARATUS FOR SOURCE DEVICE SYNCHRONIZATION IN A COMMUNICATION SYSTEM

(75) Inventors: Stephen Kuffner, Algonquin, IL (US); Timothy Collins, Lockport, IL (US); David P. Gurney, Carpentersville, IL (US); Richard S. Rachwalski, Lemont, IL (US)

(73) Assignee: Motorola, Inc., Schaumburg, IL (US)

( * ) Notice: Subject to any disclaimer, the term of this patent is extended or adjusted under 35 U.S.C. 154(b) by 186 days.

(21) Appl. No.: 10/385,893

(22) Filed: Mar. 11, 2003

(65) Prior Publication Data

US 2004/0179510 A1 Sep. 16, 2004

(51) Int. Cl.
*H04B 7/212* (2006.01)

(52) U.S. Cl. ...................... 370/324; 370/278; 370/503; 709/227; 340/2.2

(58) Field of Classification Search ................ 370/252, 370/278, 310, 324, 337, 350, 442, 498, 503; 455/12.1, 13.1, 427; 709/227; 340/2.1, 340/2.2, 825.52, 69, 72
See application file for complete search history.

(56) References Cited

U.S. PATENT DOCUMENTS 5,025,486 A 6/1991 Klughart ..................... 340/3.1
5,210,771 A 5/1993 Rice ........................... 375/132
5,294,931 A 3/1994 Meier
5,488,631 A 1/1996 Gold et al. ................. 375/145
5,500,856 A 3/1996 Nagase et al. ................ 370/18
5,640,442 A 6/1997 Fitzgerald et al. ......... 340/7.21
5,737,358 A 4/1998 Ritz et al.
5,771,288 A 6/1998 Dent et al. .................. 375/133
5,844,509 A 12/1998 Behrens et al.
5,859,839 A 1/1999 Ahlenius et al. ............ 370/252
5,883,582 A 3/1999 Bowers et al.
5,986,570 A 11/1999 Black et al.
6,034,603 A * 3/2000 Steeves ..................... 340/10.2
6,101,176 A 8/2000 Honkasalo et al. ......... 370/335
6,107,910 A * 8/2000 Nysen ....................... 340/10.1
6,256,487 B1 7/2001 Bruhn ........................ 455/352
6,260,171 B1 7/2001 Gray
6,265,962 B1 7/2001 Black et al.
6,275,478 B1 8/2001 Tiedemann, Jr. ............ 370/318
6,285,887 B1 9/2001 Mimura ...................... 455/522
6,335,685 B1 1/2002 Schrott et al.
6,337,853 B1 1/2002 Piolini ........................ 370/352
6,354,493 B1 3/2002 Mon
6,377,203 B1 4/2002 Doany
6,385,264 B1 5/2002 Terasawa et al. ........... 375/371
6,510,143 B1 1/2003 Bejjani et al. .............. 370/320
6,539,003 B1 * 3/2003 Agarwal et al. ............ 370/324
6,545,994 B1 4/2003 Nelson, Jr. et al. ......... 370/337
6,654,375 B1 * 11/2003 Vedder ....................... 370/394
6,708,044 B1 * 3/2004 Puknat et al. ............ 455/552.1
6,754,190 B1 6/2004 Gurney et al. .............. 370/329
6,804,222 B1 10/2004 Lin et al. .................... 370/338
2001/0033579 A1 10/2001 Nelson, Jr. et al. ......... 370/447

(Continued)

*Primary Examiner*—John Pezzlo
*Assistant Examiner*—Donald L. Mills
(74) *Attorney, Agent, or Firm*—Valerie M. Davis; Terri S. Hughes

(57) ABSTRACT

A communications method including the steps of: activating a plurality of signal sources, and transmitting a synchronization event to the plurality of signal sources to cause the plurality of signal sources to simultaneously transmit data in response to the synchronization event.

24 Claims, 24 Drawing Sheets

U.S. PATENT DOCUMENTS

2002/0061008 A1 5/2002 Lysejko ...................... 370/351
2002/0099854 A1 7/2002 Jorgensen .................. 709/249
2003/0026283 A1 2/2003 Currivan et al. ............ 370/441
2003/0164752 A1 9/2003 Haimovitch et al. ..... 340/10.34
2004/0066752 A1* 4/2004 Hughes et al. .............. 370/252
2004/0205191 A1* 10/2004 Smith et al. ................ 709/227

* cited by examiner

1120

LFSR STATE TABLE

| CLOCK CYCLE | s0 | s1 | s2 | s3 | DEC. STATE |
|---|---|---|---|---|---|
| 0 (ZERO OUT) | 1 | 1 | 1 | 1 | 15 |
| 1 (HELD) | 1 | 1 | 1 | 1 | 15 |
| 2 | 0 | 1 | 1 | 1 | 7 |
| 3 | 1 | 0 | 1 | 1 | 11 |
| 4 | 0 | 1 | 0 | 1 | 5 |
| 5 | 1 | 0 | 1 | 0 | 10 |
| 6 | 1 | 1 | 0 | 1 | 13 |
| 7 | 0 | 1 | 1 | 0 | 6 |
| 8 | 0 | 0 | 1 | 1 | 3 |
| 9 | 1 | 0 | 0 | 1 | 9 |
| 10 | 0 | 1 | 0 | 0 | 4 |
| 11 | 0 | 0 | 1 | 0 | 2 |
| 12 | 0 | 0 | 0 | 1 | 1 |
| 13 | 1 | 0 | 0 | 0 | 8 |
| 14 | 1 | 1 | 0 | 0 | 12 |
| 15 | 1 | 1 | 1 | 0 | 14 |

1420

WALSH CODE (0)= 0 0 0 0 0 0 0 0
WALSH CODE (1)= 0 1 0 1 0 1 0 1
WALSH CODE (2)= 0 0 1 1 0 0 1 1
WALSH CODE (3)= 0 1 1 0 0 1 1 0
WALSH CODE (4)= 0 0 0 0 1 1 1 1
WALSH CODE (5)= 0 1 0 1 1 0 1 0
WALSH CODE (6)= 0 0 1 1 1 1 0 0
WALSH CODE (7)= 0 1 1 0 1 0 0 1

8 WALSH CODES (e.g., ROWS OF $H_3$ HADAMARD MATRIX)

$$\left(H_{n+1} = \begin{bmatrix} H_n & H_n \\ H_n & \overline{H_n} \end{bmatrix},\ H_0 = 0\right)$$

| CHANNEL NUMBER | #0 | #1 | #2 | #3 | #4 | #5 | #6 | #7 |
|---|---|---|---|---|---|---|---|---|
| PASS #1 | ① | 2<br>6 | 4<br>8 | | ③ | ⑦ | ⑤ | |
| PASS #2 | 1<br>4<br>5 | 2<br>8 | | | 6<br>7 | | | 3 |
| PASS #3 | ② | | | 1<br>8 | 4<br>7 | | 3 | 5<br>6 |
| PASS #4 | | | 5 | 7 | ④ | ⑧ | 1<br>2<br>6 | 3 |
| PASS #5 | 1 | | 2 | 5<br>7 | 3 | 6<br>8 | 4 | |
| PASS #6 | | 4<br>8 | | 5 | 1<br>3<br>6 | 2 | 7 | |
| PASS #7 | | 3<br>4<br>8 | | 1<br>6 | | 2<br>5 | | 7 |
| PASS #8 | | 2<br>4 | ⑥ | | | 5<br>7<br>8 | 1<br>3 | |

LEGEND: CIRCLED ITEMS ARE NEWLY ID'd
SHADED ITEMS ARE PREVIOUSLY ID'd

*FIG. 21*

METHOD AND APPARATUS FOR SOURCE DEVICE SYNCHRONIZATION IN A COMMUNICATION SYSTEM

REFERENCE TO RELATED APPLICATIONS

The present application is related to the following U.S. applications commonly owned together with this application by Motorola, Inc.;

Ser. No. 09/982,279, filed Oct. 17, 2001, titled "Collision Mitigation Methods used in a Communication System" by Kuffner, et al;

Ser. No. 10/385,549, filed Mar. 11, 2003, titled "Method and Apparatus for Electronic Item Identification in a Communication System" by Kuffner, et al.; and Ser. No. 10/385,886, filed Mar. 11, 2003, titled "Method and Apparatus for Adaptive Processing Gain for Multiple Source Devices in a Communication System" by Kuffner, et al.

FIELD OF THE INVENTION

The present invention relates generally to a synchronization method used in a communication system.

BACKGROUND OF THE INVENTION

A fast, efficient and reliable means of communicating data in a multi-user system is desirable for many applications. A need for such methods arises when multiple pieces of data (from multiple sources) need to be quickly read by a receiver. One particular application of such technology is in the electronic identification of multiple items.

The electronic identification industry is important for numerous commercial and military applications, including real-time item tracking and inventory. Such uses can greatly increase operational efficiency in a myriad of scenarios, including virtually all of those involving some form of manufacturing, warehousing, distribution and retail. The ability to quickly and efficiently perform accurate real-time inventory tracking can greatly reduce waste in many forms, including, but not limited to, the misplacement of items, over- or under-stocking of items, and item theft.

Currently, the electronic identification industry relies heavily on manual (light-based) scanning to identify a plurality of items, where each item is assigned a product code. The Universal Product Code (UPC) system is currently in widespread use throughout the United States retail industry. Manually scanning items, however, is extremely time-consuming and highly prone to human error.

Thus, there exists a need to provide a method for fast, efficient and reliable transmission of data from multiple sources to a receiver. More specifically, there exists a need to read such data as quickly as possible for all possible operating cases in an RFID system. In order to maximize data communications throughput, a RFID system may utilize a very high symbol rate, high enough that it is an appreciable fraction of the RF carrier frequency. Reliable system operation must be preserved for these cases. In some low carrier frequency systems, as few as two RF cycles per symbol may need to be used in order to achieve the desired throughput. Such a high relative symbol rate system leaves little margin for timing error (especially for systems that rely on good symbol synchronization), emphasizing the necessity of a highly accurate synchronization method and apparatus.

BRIEF DESCRIPTION OF THE FIGURES

The present invention is now described, by way of example only, with reference to the accompanying figures in which like references indicate similar elements and in which:

FIG. 21 illustrates an example inventory accounting with no collision mitigation techniques applied in accordance with the present invention;

DETAILED DESCRIPTION OF THE PRESENT INVENTION

The described system provides an improved communications method that allows multiple source devices to quickly and efficiently communicate information to a destination device. The described communications system employs a combination of several techniques to achieve superior performance over the prior art. To achieve the desired throughput in one embodiment of the system, the source devices communicate at a very high symbol rate to carrier frequency ratio, especially at low carrier frequencies (e.g., 125 kHz), though the described method is applicable to higher frequency systems as well. In general, the described techniques become even more important for high (absolute) symbol rate systems. High symbol rate (or high chip rate spread spectrum) systems are desirable for high speed high throughput communication links, where large amounts of data need to be quickly transferred from one (or more) locations to another.

The described system provides a means for UPC replacement, while adding additional features and benefits, such as the elimination of manual (light-based) scanning, and greatly increased scanning (or item identification) speeds. The present invention further provides for fast, simultaneous identification of numerous items, which is highly useful in many applications, such as managing inventory on store shelves, or the like. Often, the management of such information is more valuable when it is performed in real or near-real time. The present invention allows the use of very high symbol rate to carrier ratios, or high absolute symbol rates, increasing throughput and hence reducing the amount of time necessary to account for a given number of items.

The preferred embodiment of the present invention generally utilizes one-way communication (from the source device to the destination device) in order to simplify the circuitry on the source device; the source device does not require the use of a data receiver.

The information communicated from the source device to the destination device typically takes the form of binary electronic product codes ("EPC") or identification ("ID") information, though it is not limited in any manner to these forms of information. Communicating other types of information, such as electronic telemetry (or any other type of measured or assigned data) is also possible. In fact, any information that has a representation in a binary (or other) number format can be communicated with the described system.

Figure 1:
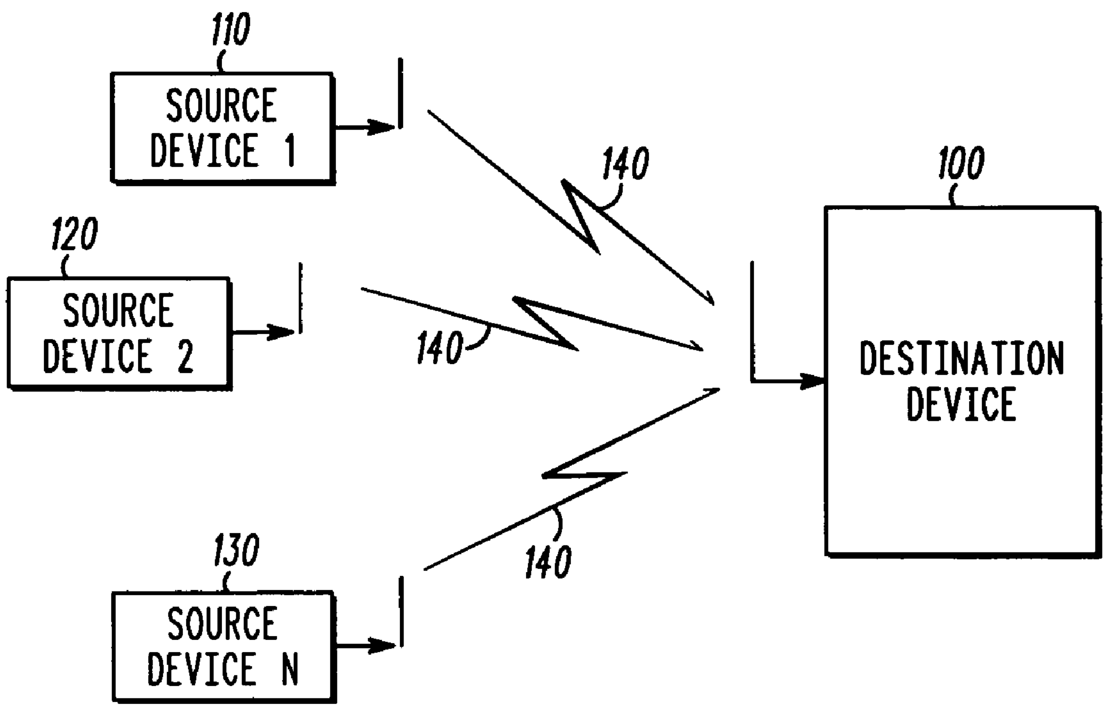
FIG. 1 illustrates a high-level view of multiple source devices communicating with a single destination device in accordance with the invention.

As illustrated in FIG. 1, the information is typically communicated from a set of source devices 110, 120, 130 to a single destination device 100; the preferred embodiment of the present invention utilizes simultaneous communication of information from the set of source devices 110, 120, 130 to the destination device 100. Since the present invention has numerous applications, depending on the context of the example, some terms used throughout the discussion are interchangeable with other terms for ease of clarification. Thus, it should be noted that the following terms are used interchangeably throughout the following discussion without loss of generality: source device, transponder, user, item, tag, or the like; it should also be noted that the following terms are used interchangeably throughout the following discussion without loss of generality: destination device, system controller, interrogator, reader, receiver, or the like.

The communication system employed by the present invention can encompass several different forms of communication 140, including, but not limited to, optical communication, radio frequency (RF) communication, wired (contacted) communication, sound-wave communication, capacitively coupled communication, or inductively coupled communication. The preferred embodiment of the present invention utilizes a capacitively coupled communication link between the tags 110, 120, 130 and the reader 100, though other forms of communications links may be utilized without limitation.

The following description of the invention is divided into several background sections (I–II) describing many important aspects of the system, and latter sections (III–V) providing a detailed descriptions of the present invention. The preferred embodiment of the system utilizes all of the key techniques described below, though other embodiments may utilize only a subset of the described techniques.

I. Data Scrambling and Descrambling

Figure 2:
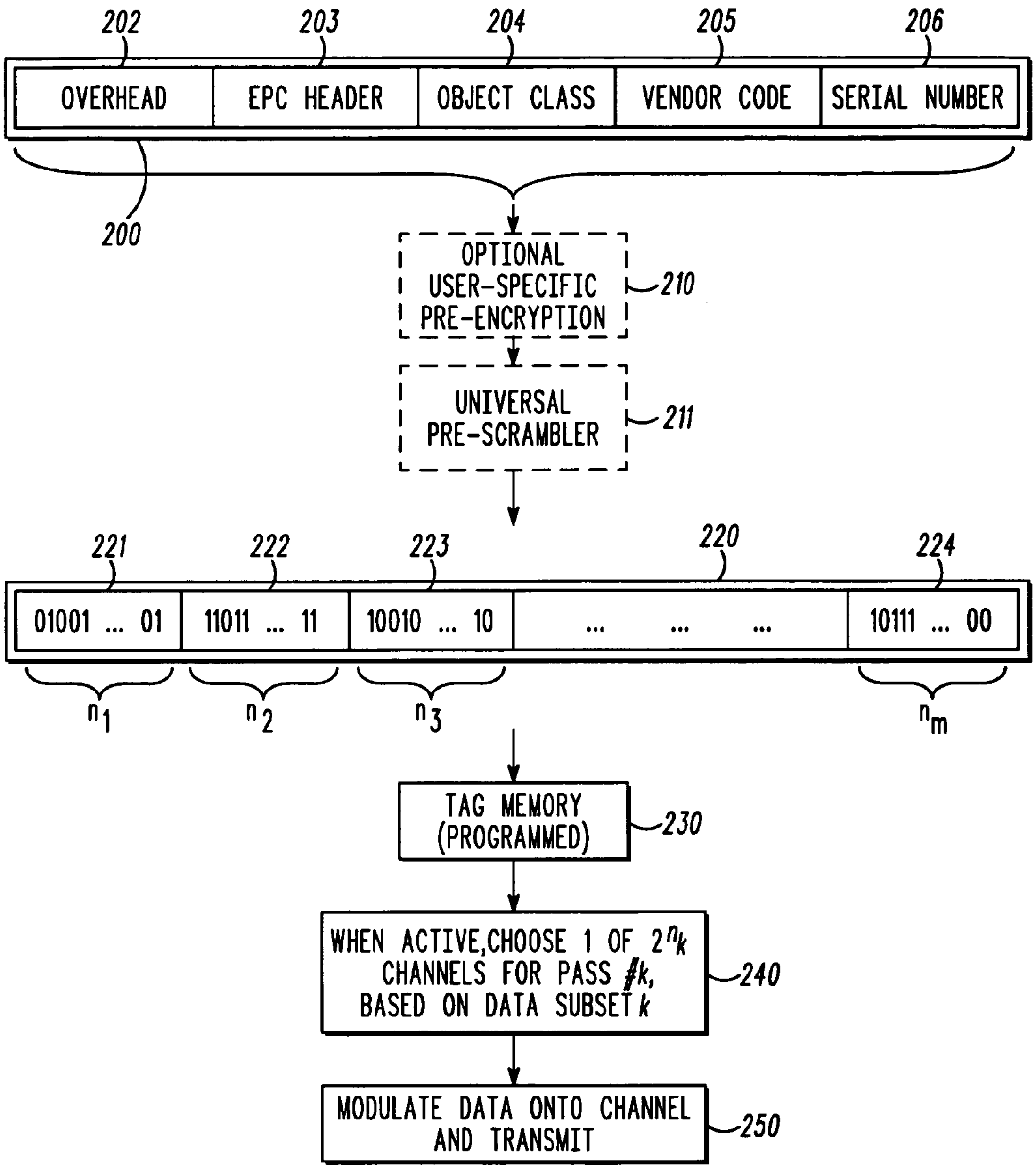
FIG. 2 illustrates how data stored on a tag is altered and used to determine communications channels while operating in accordance with the invention.

As shown in FIG. 2, the data 200 that is communicated by the tag 110 to the reader 100 in the described system can take many forms, including, but not limited to, measured or other user defined data as described below. In the preferred embodiment of the present invention, the communicated data 200 consists of at least an identification data sequence. For example, the data 200 may consist of at least an EPC having 96-bits of identification data as outlined by David L. Brock in "The Electronic Product Code," MIT-Auto ID Center, January 2001. The EPC 200 serves to uniquely identify each tag (or item) 110 in the system, by reserving fields for a header 203, object class 204, vendor code 205, and serial number 206. Note, for example, that 96-bits of information provides for a huge number of unique IDs ($2^{96}$~$8\times10^{28}$; as an indication of the enormity of this number, the mass of the earth is $6\times10^{27}$ grams).

Additional information 202 is typically appended to the stored data 200 on the tag 110 in the preferred embodiment, such as user information, error checking or correction information (e.g., forward error correction (FEC), cyclic redundancy checks (CRCs), etc.), and other reserved bits. Note that the additional information (e.g., error detection or correction data) may be appended either before or after the data scrambling process described below, though it is desirable that if this additional information is appended after the data scrambling that it also has uniformly random properties.

Those skilled in the art recognize that several different additional forms of information (e.g., programmable timestamps, other user personal identification numbers (PINs), measured data, environment data, etc.) may also be predetermined and stored on the tags 110, 120, 130. Note that there are no limitations placed on the amount or type of data stored on the tags 110, 120, 130 in the described system.

All of the tag functions are typically implemented in low complexity (i.e., low cost) circuitry. In order to keep the circuitry on the tag 110 simple, and to improve performance of the channel selection process in the system (as fully described below), it is highly desirable to scramble the original ID data 200 prior to its being stored on the tag 110. This is typically accomplished through a randomization or scrambling process 211 that is carried out before the operation of storing data 230 on the tag 110.

This scrambling algorithm 211 is typically applied universally throughout the system in order to assure that the EPC data 200, after being scrambled 220, exhibits desirable statistical (i.e., uniform and random) properties. Alternatively, in other embodiments, some other scrambling, encryption, or numbering assignment algorithm may be applied to the stored data 200 in order to effectively create the scrambled data 220. To gain additional information privacy, individual vendors may optionally apply pre-encryption 210.

Figure 3:
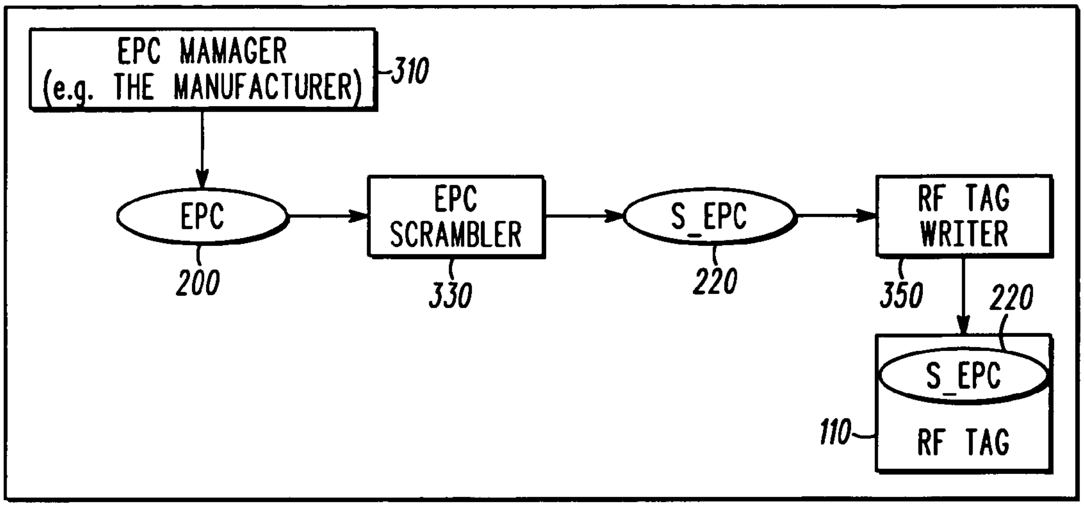
FIG. 3 illustrates a high-level view of the process used to scramble the stored data on a tag in accordance with the invention.

FIG. 3 illustrates an example of the system for embedding scrambled data 220 into the tag 110 in accordance with the preferred embodiment of the described system. In FIG. 3, the original EPC 200 is obtained in the usual manner from the EPC manager 310, such as the manufacturer. The EPC 200 is then input into a scrambler 330 that performs a scrambling algorithm and output the scrambled data (S_EPC) 220. A RF tag programmer/writer 350 then embeds the scrambled data, S_EPC, 220 into the tag 110. The scrambled data 220, which is a modified version of the original data 200, now resides inside the tag 110.

Figure 4:
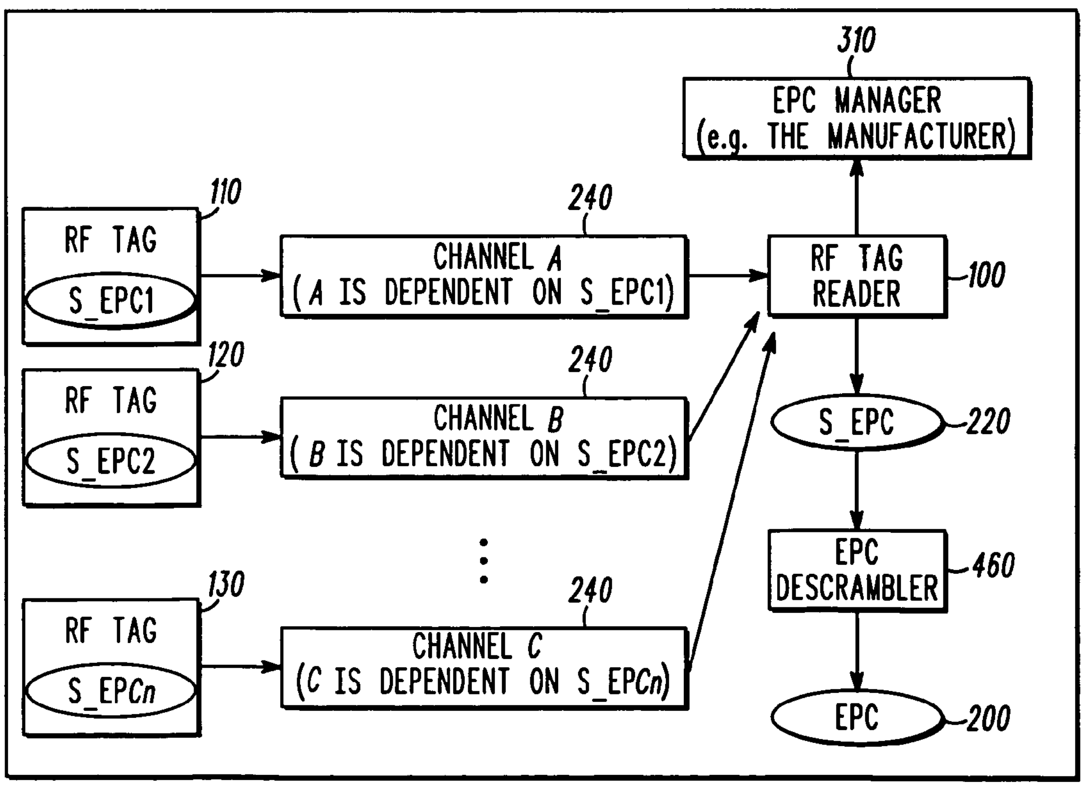
FIG. 4 illustrates a high-level system view of multiple tag communications and the scrambling reversal (descrambling method) performed in the reader in accordance with the invention.

FIG. 4 illustrates a high-level block diagram for simultaneously reading electronic identification data 200 from many RF tag devices 110, 120, 130. This example illustrates how the tags associated with products residing on a shelf might be read during a typical inventory count. In operation, the reader 100 simultaneously activates a set of tags 110, 120, 130. The activated tags 110, 120, 130 then proceed with a multiple-pass transmission algorithm using the scrambled tag data 220 as a basis for channel selection (described in detail below in Section III).

For example, in a first pass of the multiple-pass algorithm, at least a portion of S_EPC1 (which is embedded in tag 110) is used to select Channel A 240, at least a portion of S_EPC2 is used to select Channel B 240, and at least a portion of S_EPCn is used to select Channel C 240. It should be noted that channels A, B and C, or any combination thereof, can be the same or different. The reader 100 proceeds with its demodulation algorithm, and eventually obtains the S_EPCs 220 for the tags 110, 120, 130 on the shelf. The S_EPCs 220 are routed into a descrambler 460 that performs a descrambling algorithm to obtain the original EPC data 200 of the tags 11, 120, 130. The EPC data 200 corresponding to each tag can then be kept in the reader 100 or sent back to the original EPC manager 310 (e.g., the manufacturer) in the form of an inventory report. Those skilled in the art recognize that the descrambling operation may be performed at other locations, such as a remotely located computer or an on-line server. Collisions in the system of FIG. 4 are minimized because, instead of the highly structured EPC data 200, the tags 110, 120, 130 use at least a portion of the scrambled versions of the EPC data 220 to select a channel during each pass of the multiple-pass transmission algorithm. This scrambled data 220 very closely resembles uniformly distributed data, thus collisions between products with similar EPC data 200 are minimized. For more on multiple-pass transmission algorithms and channel selections, see Section III below; for more on collisions and collision resistance, see Section V below.

Other than synchronization information (and possibly spreading gain adjustment), no information is exchanged between the tag 110 and the reader 100 before the tag 110 needs to select a channel to use for transmission (as described below). Thus, the scrambling and de-scrambling methods in the described system must be self-referential only; that is, the only information needed to scramble the EPC 200 or descramble the S_EPC 220 is the data itself.

The system described calls for the use of a scrambling method that possesses certain key properties. An important property is that the scrambling method maps typical data sequences (such as EPC data sequences) to results that exhibit properties of a uniform random distribution. In the preferred embodiment, the scrambling method has two main properties:

1. Given two typical EPCs 200 represented with k-ary digits, where k is a predetermined integer (e.g., in a typical pair of EPCs 200 many, but not all, of the k-ary digits are the same), the probability that the scrambled S_EPCs 220 corresponding to these EPCs 200 match for n consecutive k-ary digits (used by the tag 110 to determine channel assignments) is approximately $1/k^n$; and
2. Given two typical EPCs 200 represented with k-ary digits, where k is a predetermined integer (e.g., in a typical pair of EPCs 200 many, but not all, of the k-ary digits are the same) whose scrambled outputs match for n consecutive k-ary digits (used by the tag 110 to determine channel assignments), the subsequent m k-ary digits (used by the tag 110 to determine subsequent channel assignments) will match with probability approximately $1/k^m$.

In the example of a binary represented EPC 200, these properties are related to a strong avalanche property whereby each output bit is dependent on every input bit and changing a single input bit, changes half of the output bits on average.

In addition to the scrambling process described above, the data 200 may also be encrypted 210 before or after applying the universal scrambling algorithm (e.g., prior to programming the tag 110) to assure further data security. There are a variety of known encryption algorithms (e.g., AES, Data Encryption Standard, International Data Encryption Algorithm, etc.) in the art that may be utilized for this task. The availability of this additional level of security is important for high-privacy applications (such as those where tags may contain sensitive medical or financial data).

II. Power-On Methods

Figure 7:
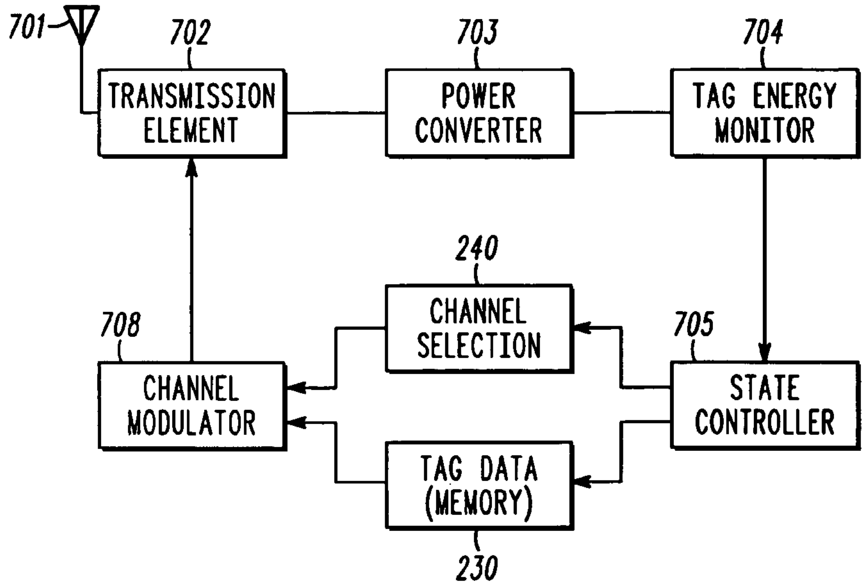
FIG. 7 illustrates a high-level block diagram of a tag in accordance with the invention.

A block diagram of a tag 110 in the spirit of the preferred embodiment is illustrated in FIG. 7. For a capacitively coupled system, the antenna 701 is a pair of conductive electrodes (e.g., capacitive plates), but in general can be any method of coupling energy from an electromagnetic field into a circuit. The alternating current ("AC") power in the RF carrier signal, generated by the reader 100, is coupled into the passively powered tag 110 and is rectified in power converter 703, the direct current ("DC") output of which is used to power the tag 110 and also serve as a tag energy monitor 704 which further enables communications (the elements of which will be discussed in more detail below). The tag is said to be passively powered since it has no local power source. The state controller 705 acts on the tag data 220 and the communications channel selection block 240 to produce transmit information, which is applied to the transmission element 702 (such as a load modulation element that is well understood in the art) under the control of the channel modulator 708. Synchronization generally occurs in energy monitor 704, which is used to time align the communications from all the source devices, as described further in Section III.

Figure 8:
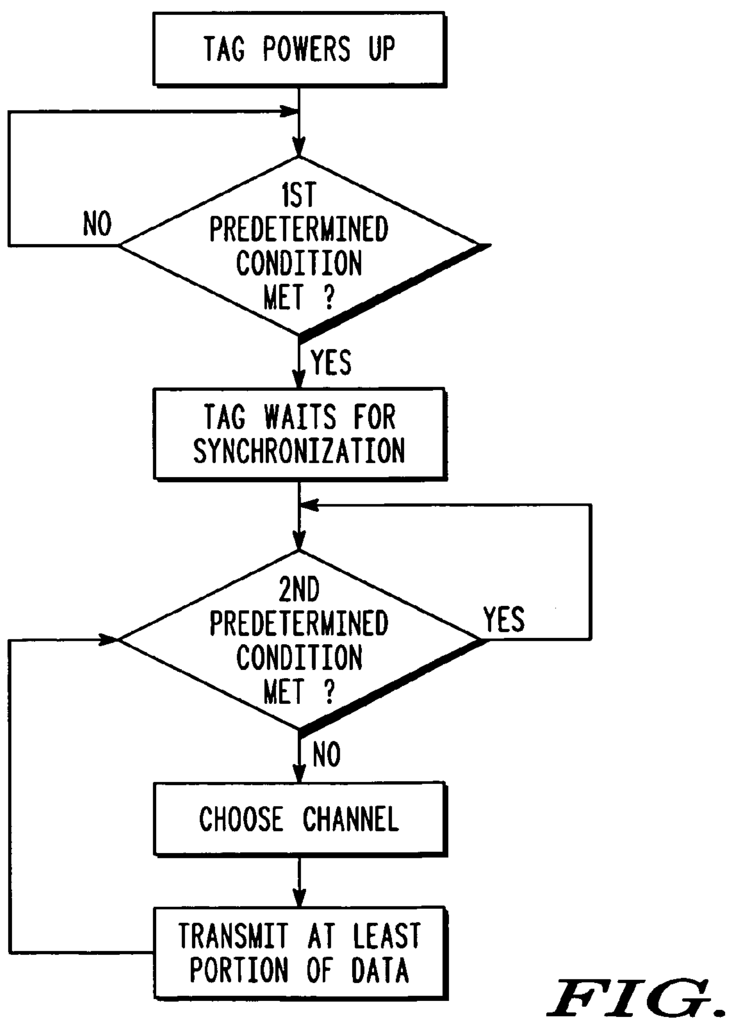
FIG. 8 illustrates a general flowchart outlining tag transmission conditions in accordance with the invention.

The data 220 stored on each tag 110 is typically stored in low complexity (i.e., low cost) circuitry, which then responds to inquiries from the reader 100. Each tag 110, 120, 130 typically waits for a first predetermined condition to be met before activating and transmitting its information in a multiple pass algorithm. The first predetermined condition is typically set to be the same for each of the tags 110, 120, 130, though it could be randomly chosen or assigned in other embodiments. An example of a general flowchart showing tag transmission conditions is shown in FIG. 8. Note that in this flowchart, the second predetermined condition may be met by a variety of measures (e.g., when a first predetermined condition is no longer met or a second predetermined condition is met).

Figure 9:
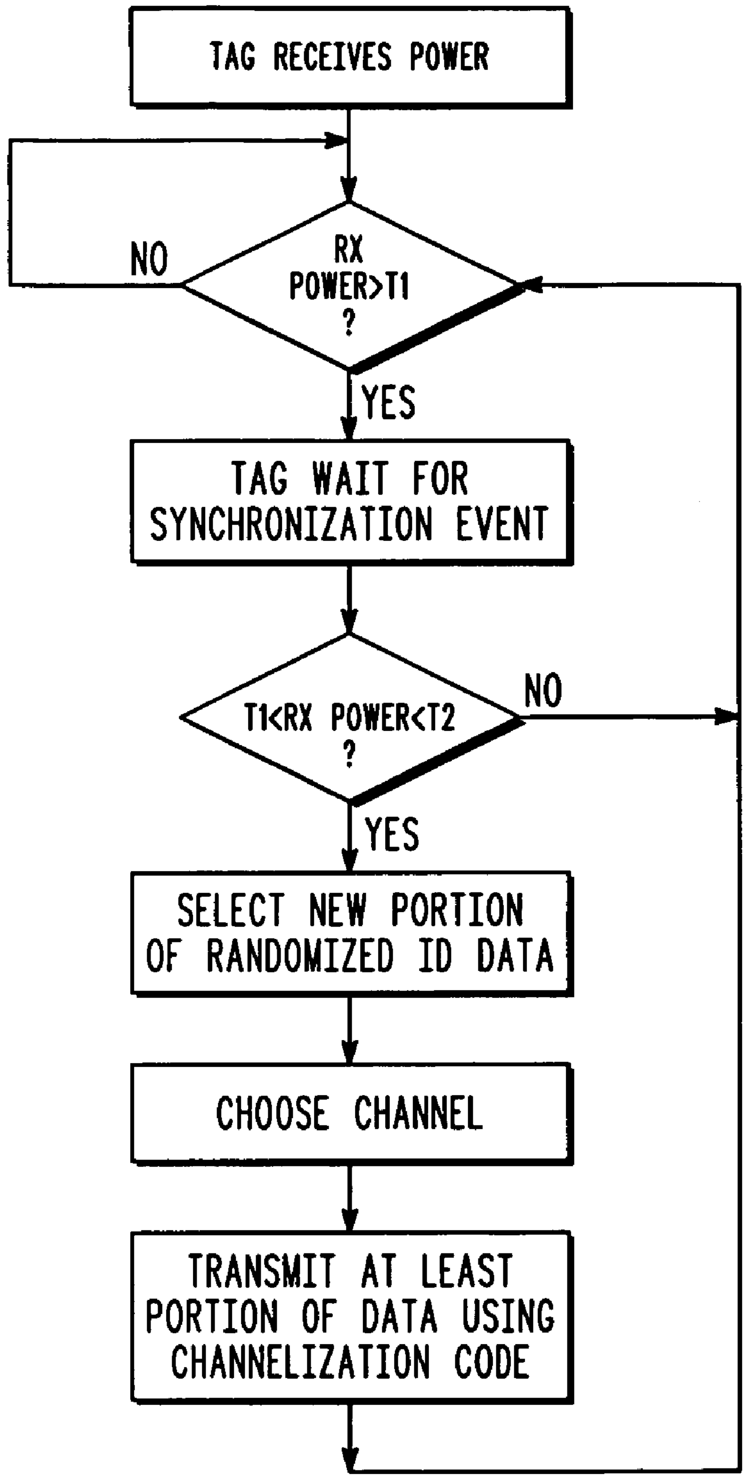
FIG. 9 illustrates a detailed flowchart outlining tag transmission conditions in accordance with the invention.

In the preferred embodiment, the reader 100 remotely powers the tags 110, 120,130, via the carrier signal and synchronizes the system. The first predetermined transmission condition is met when the instantaneous received power level at the tag 110 exceeds a predetermined threshold (that is generally determined by 703 and 704). FIG. 9 illustrates a flowchart of this action, where T1 and T2 represent a first and second power level threshold. In general, the tag will only respond to the synchronization event, typically a gap in the carrier of a predetermined duration, if the first predetermined condition T1 is satisfied, even though it may have sufficient power to operate and synchronize without T1 being satisfied. If the tag should happen to cross into the condition where T1 is satisfied after the synchronization pulse or gap (i.e., the absence of transmission of the carrier signal) has occurred (e.g., due to movement of the tag in the powering field or some other change in coupling conditions), the tag will not communicate until the next synchronization event is received from the reader. Though in general only the first pass of the multiple pass algorithm needs to be synchronized, this is not a limitation and additional synchronization events may happen during subsequent passes of the multiple pass algorithm as well. In some applications of the present invention, it may be desirable to resynchronize all actively transmitting tags at the start of each transmission pass (such as in cases where tags may be using local oscillators for symbol clock sources, where for a spread spectrum system as described here, the symbol clock is the chip clock). A synchronization event may be communicated to the tags in general through the use of pulse width modulation techniques, in which case other information may be simultaneously conveyed to the tags (in addition to synchronization information). For example, synchronization events may also be used to simultaneously signal other events, such as the adjustment to the number of available channels in the system, as disclosed in application Ser. No. 10/385,886, filed Mar. 11, 2003, titled "Method and Apparatus for Adaptive Processing Gain for Multiple Source Devices in a Communication System" by Kuffner, et al., or the adjustment of the power-on range (i.e., the predetermined conditions) as a means of futher active population management. Pulse width modulation could be utilized to signal to all active tags to either increase or decrease their power on ranges, in addition to synchronizing the tags' transmissions. Since the multi-source communications system channelization relies on approximate synchronization between sources, it is important that transmitting sources be synchronized.

Note that implementations employing other predetermined transmission conditions can be utilized by those skilled in the art without departing from the spirit of the described system. Once the tag 110 receives synchronization and power (either remotely from the reader 100 for a passive tag, or self-powered for an active tag), the tag 110 continuously monitors the received signal strength to determine whether it remains within the predetermined conditions that allow transmission. The tag also may remain receptive to reader signaling (e.g., additional synchronization or adaptation pulses or gaps) as mentioned above. Once the tag 110 begins modulation and transmission 250 of its data, it is fully activated. Note that multiple tags 110, 120, 130 will typically be fully activated at a given time in the preferred embodiment of the system.

The fully activated tags in a group will continue to transmit their information in multiple passes (fully described below) until a second predetermined transmission condition is met, at which time they will stop transmitting data. The second predetermined transmission condition in the preferred embodiment is met when the received power level at the tag 110, as observed by tag energy monitor 704, either falls below the first predetermined threshold or exceeds a second predetermined threshold, which is typically set higher than the first predetermined threshold.

In this manner, the first and second predetermined transmission conditions form a range of received power levels (e.g., a window) over which each group of tags is typically fully activated. In the preferred embodiment of the described system, the power-on range is typically about 3 dB wide, meaning that tags 110, 120, 130 will respond to power in a range of 1–2× (relative to some normalized received operational power level). Note that this powering window generally causes the tag's transmissions to fall within a proportionally narrow power window, which helps alleviate the typical near-far problem that affects some communications systems (e.g., as in spread spectrum systems with non-orthogonal spreading codes).

All of the tags 110, 120, 130 in the system are typically assigned the same power-on range in the preferred embodiment, although other embodiments are possible, such as those that utilize programmable (e.g., pre-assigned, but likely different) or random power-on conditions. One such example may occur when different manufacturers are assigned different power-on range levels, providing some separation (or distinction) between different manufacturer's products.

In yet other embodiments of the described system, tags with two-way communication abilities (beyond basic synchronization) may exist, in which case the first and second predetermined transmission conditions may consist of some other signaling information. In the case where the predetermined transmission conditions are random, they may be randomly determined on the tag 110, adaptively determined by the reader, or during programming of the tag 110. Note once again that other implementations of these transmission controls (e.g., two-way communication with the tag, etc.) are possible without departing from the spirit of the system.

Figure 10:
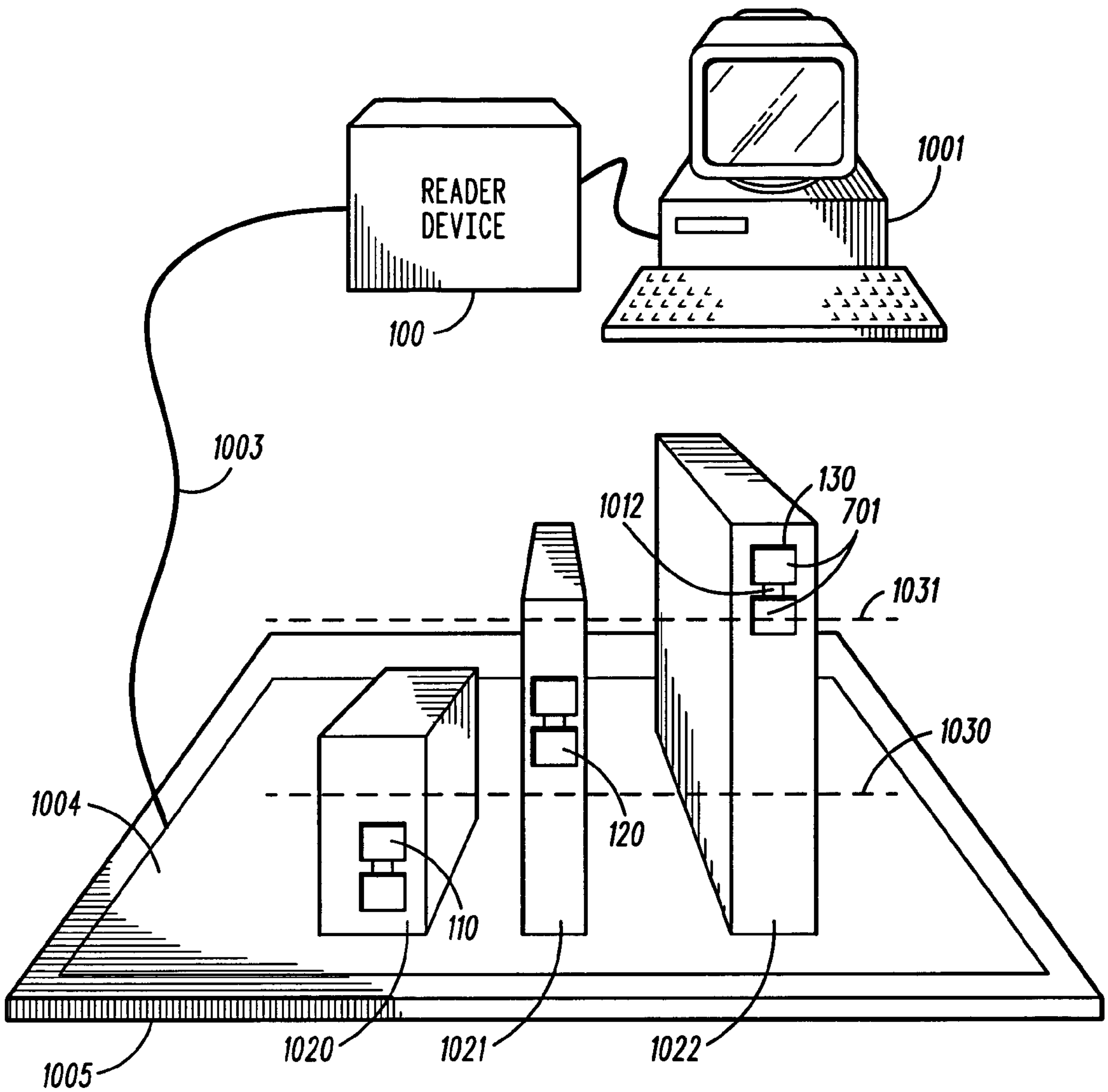
FIG. 10 illustrates an application using capacitive coupling between the reader and a variety of tags in a typical embodiment in accordance with the invention.

In an example embodiment illustrated in FIG. 10, the reader 100, which may be remotely controlled from a head office by controller 1001, is connected via a transmission medium 1003 to an antenna 1004 mounted on a shelf 1005. Objects 1020, 1021, 1022, of varying physical dimensions, have tags 110, 120, 130 located on different parts of the packages, and result in variations in coupling between the antenna 1004 associated with the reader 100 and the antenna 701 associated with the tags 110, 120, 130, further resulting in different received power levels by tag electronics 1012. Due to different coupling characteristics between the reader antenna 1004 and various tags 110, 120, 130 in the system, different tags may receive different power levels (demonstrated by the range boundary lines 1030 and 1031) for a given reader antenna excitation level (i.e., reader transmit power level). This effect also serves as a coarse population reduction of the tags present in the system in the preferred embodiment, since it is likely that various tags 110, 120, 130 will begin transmitting at different reader transmit power levels and hence different times. Note, however, that multiple tags 110, 120, 130 will still typically begin transmission simultaneously for a particular power level in the preferred embodiment of the described system. For example, there may be one thousand items (tags) in an inventory that need to be identified, and the reader 100 may step through ten different possible power levels, activating groups of roughly one hundred tags at each power level (though fewer tags will likely be activated at the extreme upper and lower power levels). In other embodiments of the system, transmissions from multiple tags may only be synchronized (though not necessarily simultaneous), such as in the case of time-slotted (channelization) systems, where users choose a particular time slot (relative to a common reference) to transmit on. Note that in one embodiment, the reader 100 will step through all possible transmit power levels, starting with the lowest transmit power level. Thus, due to the particular power-on ranges of the tags 110, 120, 130, the reader 100 effectively controls when each group of tags begins and ends transmissions. This aspect is important since the reader 100 determines when all of the tags 110, 120, 130 in a particular power-on range (e.g., between 1030 and 1031) have been uniquely identified, at which time it can step to the next power level (e.g., above 1031) or terminate the identification process.

In another embodiment, the reader 100 may 'learn' or remember a range of expected power levels for a given inventory profile, and arrange its power sweep with priority given to those power levels with a history of activity. When the reader 100 steps to a power level where no tags are activated, it senses that condition (typically through a short energy or modulation detection measurement), and quickly steps to the next power level, so as to minimize the total reading time of the tags, as further described below. In other applications, the reader could signal the tags to adapt their power-on range (e.g., to a narrower or wider power-on window), so as to optimize the overall efficiency of the transmission system.

III. Channel Selection and Transmission Methods

All multiple source (or multi-user) communications methods use some type of channelization method, as does the present invention. It is possible to utilize any one of several channelization methods or techniques in the described system. Generally, the channelization methods utilized can be divided into two categories: orthogonal channelization methods or quasi-orthogonal channelization methods. The present invention relies on the fact that system operation (i.e., the number of available channels) can be optimized for a given number of active tags and communications channel conditions.

Orthogonal communications channels have the advantage that communication on a chosen channel does not interfere (at all) with communication on other channels in a linear system (i.e., the cross-correlation over a symbol time between different channels is defined as zero). Quasi-orthogonal channels are nearly orthogonal (e.g., having a cross-correlation value near zero for different channels), and are typically utilized in direct-sequence code division multiple access (DS-CDMA) systems, where each user is typically assigned a different spreading code.

It is well known in the art that different phases (i.e., time shifts) of a maximal length linear feedback shift register ("LFSR") sequence (i.e., an m-sequence) are known to have low (i.e., quasi-orthogonal) cross-correlation properties. The cross correlation value of two unaligned sequences is defined to be $-1/N$ (normalized), where N is the length of the LFSR pseudonoise ("PN") sequence. Different code phases of the same base m-sequence are often used to channelize different users in a code-division multiple access system. Each symbol or bit in the PN sequence is typically referred to as a 'chip', as is well known in the art.

Figure 11:
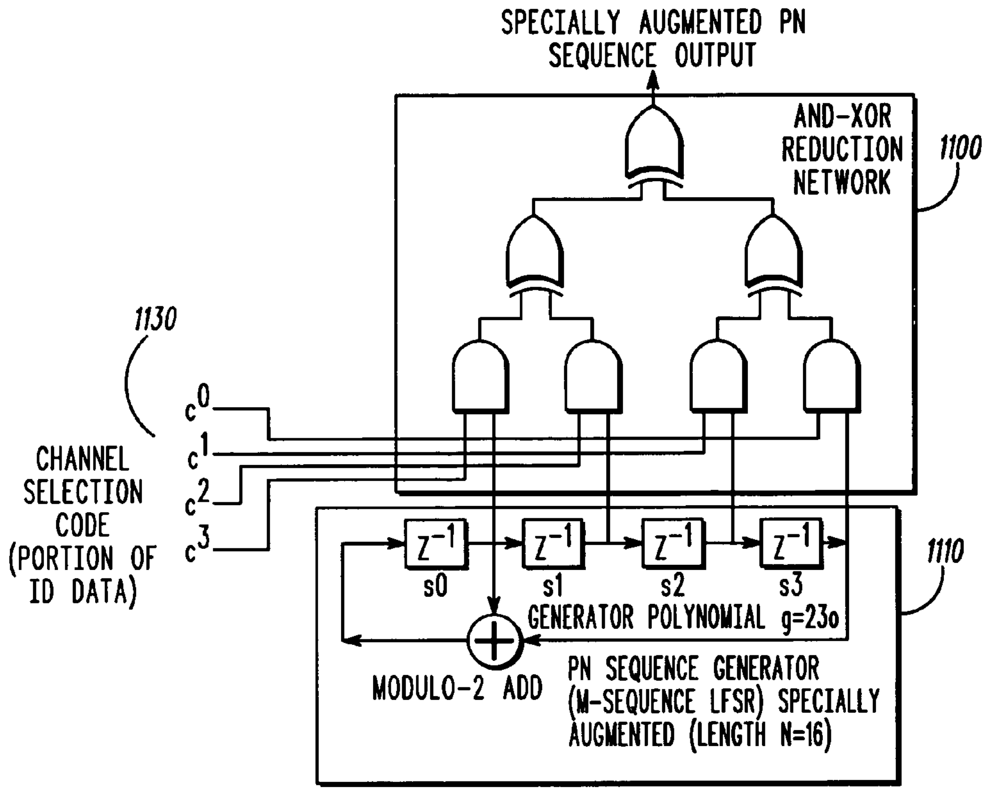
FIG. 11 illustrates a method of generating a channel for the tag to communicate over based on the data stored on the tag in accordance with the invention.

An example of a specially augmented PN code is one that has an artificially inserted (i.e., not generated by the normal operation of the LFSR) binary zero into the sequence (at different points in the sequence depending on the code phase), such that the time-aligned (i.e., synchronized) artificially inserted zero occurs at the same time offset on each channel, resulting in a zero cross-correlation value between different code phases of the same m-sequence. Note that the preferred embodiment of the present invention utilizes these specially augmented m-sequences (whose generation is shown in FIG. 11) to obtain orthogonal code channels in the synchronized system. As an added benefit of the employed spread spectrum techniques, resistance to interference (also called processing or spreading gain) is also achieved, as is well known in the art of communications. The application of such techniques is important for harsh electromagnetic environments, such as factory settings.

The need to maintain orthogonality, especially in systems with many users, emphasizes the need for accurate timing synchronization. In particular, for spread spectrum RFID systems that utilize orthogonal spreading codes (e.g., specially augmented m-sequences, Walsh codes, etc.), accurate chip-level timing synchronization is especially important. In an ideal noise-free system, the modulation pulses are square and perfectly time aligned, and any sampling instant within the chip period will suffice. However, once receiver filtering is introduced, especially receiver filtering that is intended to limit the noise bandwidth and maximize the SNR, the sample timing range over which a pulse departs little from the ideal sampling level begins to shrink or even disappear. This departure from the ideal level is due to linear distortion often referred to as intersymbol interference (ISI) as is well known in the art, and the amount of error is dependent on the previous and in some cases subsequent data symbols around the symbol sampling instant in question.

The distortion that forms around a sampling point due to filtering is in general non-orthogonal to the PN codes it is being correlated against. This distortion appears as a noise contribution at the output of the correlator. In typical communication systems, this distortion, which is proportional to the signal strength since it is caused by the signal, may have an RMS value that is 5 to 10% of the signal level. In such a case, such ISI distortion limits the signal to noise ratio to 20 to 26 dB, even in very strong signal conditions. This is more than sufficient SNR for single-occupied channeling methods such as TDMA, unless higher order constellations are being used (e.g., 16 QAM or greater).

However, in CDMA spread spectrum systems, all users are present at the same time on the same frequency. When many users are present, the non-orthogonal linear distortion from each user will sum to an overall noise level that is proportionally worse than that contributed by a single user. The user in question is subjected not only to its own ISI (which is in general non-orthogonal to its code), but also to ISI generated by the other users (which will also in general be non-orthogonal to its code) since all waveforms are present simultaneously. In general the orthogonality of the spreading codes breaks down as time synchronization slips between users (especially for orthogonal spreading codes). For example, if there are 100 simultaneous users, all with the same signal level, and they each have an SNR due to linear distortion of 26 dB, the overall distortion that each signal sees is the sum of those 100 distortion waveforms, or 20 dB greater, resulting in a SNR for each signal of 6 dB. If there is some signal level variation, the weaker tags will see somewhat worse SNR and the stronger tags somewhat better SNR.

The preceding discussion still presupposes accurate timing alignment of the waveforms. If the waveforms are misaligned in time, their ISI is in general greater than a few percent, and the distortion (noise) they contribute to the composite signal can be worse. If the tags relied only on power-up or threshold crossing information to synchronize their communications, several situations could arise which would significantly degrade performance. There are two possibilities for the tags to be improperly synchronized, both of which will be demonstrated in greater detail in the subsequent paragraphs. In one case, the tags are crossing the power-up threshold for their first predetermined condition at different times due to numerous effects, such as differences in coupling and tolerances in the thresholding circuits on the tag. This effect can result in as many as two or more cycles of a carrier in timing misalignment, though this can be mitigated to a large extent by keeping a relatively narrow power window. In systems where the symbol rate is much smaller than the carrier frequency, this does not produce a significant timing error. However, for systems where the symbol rate is an appreciable fraction of the carrier or is at a large absolute rate, the timing misalignment can be significant or even prevent communication in extreme cases. The timing uncertainty introduced by these effects can be considered a power-up ambiguity.

In another case, the tags can be physically oriented differently, and their frame of reference is uncertain. For example, if one tag is upside-down relative to another in a capacitively coupled system, the polarity of the E-field that is powering it and the sense of the zero-crossing of the carrier that is providing its timing is half of a carrier cycle out of phase. Again, in systems where the symbol rate is much smaller than the carrier frequency, this does not produce a significant timing error. However, for systems where the symbol rate is an appreciable fraction of the carrier, this is another source of significant (though lesser) timing error. This contribution to the timing misalignment is termed orientation ambiguity. Note that other coupling methods, such as inductive or electromagnetic, are also susceptible to these same effects. For example, in inductive systems, if the plane of the inductor is reversed relative to the H-field, the induced voltage carries the opposite sign by virtue of the fact that $$emf = -N \cdot \frac{d\Phi}{dt}$$

where emf is the induced voltage, N is the number of turns in the inductor, Φ is the linked magnetic flux, which is differentiated with respect to time t. In this case, if the plane of the inductor is flipped the linked flux has the opposite sign and so also does the induced emf.

Figure 5:
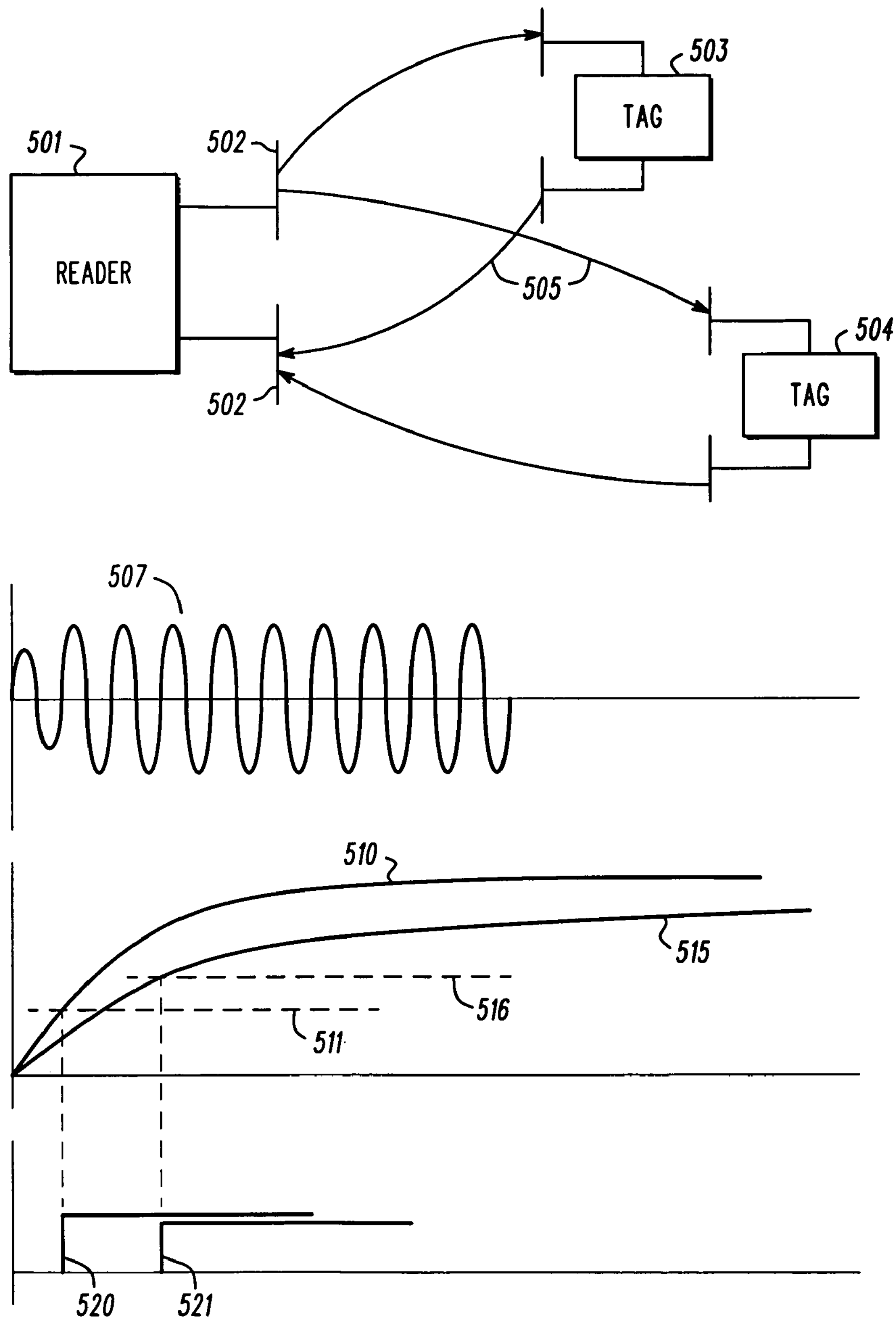
FIG. 5 illustrates a high level system and accompanying waveforms in accordance with the present invention.

FIG. 5 demonstrates power-up ambiguity by showing a diagram of the system and waveforms seen at two tags coupled to the same reader with different coupling values and possessing different threshold tolerances. 501 is the reader device, connected to antenna 502. Closer-coupled Tag 1 (503) and further-coupled Tag 2 (504) are coupled through field lines represented by 505. The reader carrier waveform 507 rises relatively quickly depending on the transient response of the transmitter filter. However, Tag 1 and Tag 2 will have DC waveforms that rise more slowly since the DC-side bypass capacitor has a limited amount of induced charge available to accumulate per RF cycle. For strongly coupled tags, more charge is induced on the tag antenna to be pumped into the DC-side bypass capacitor per cycle and it subsequently rises faster. Weakly coupled tags will have less charge induced on their plates and hence will take longer to charge the same bypass capacitor, essentially because the rectifier has a larger dynamic source impedance due to the smaller amount of current flowing through it. These varying charge injections result in the two different charging waveforms 510 (for Tag 1) and 515 (for Tag 2).

In addition, the tags may have component tolerances that may not line up favorably in light of the coupling differences. These tolerances will affect the threshold used to determine whether the ‘turn-on’ condition has been satisfied. These tolerances will add further uncertainty to the instant at which the tag recognizes that it is turned on, as shown in waveforms 520 (Tag 1 power-on) and 521 (Tag 2 power-on).

Figure 6:
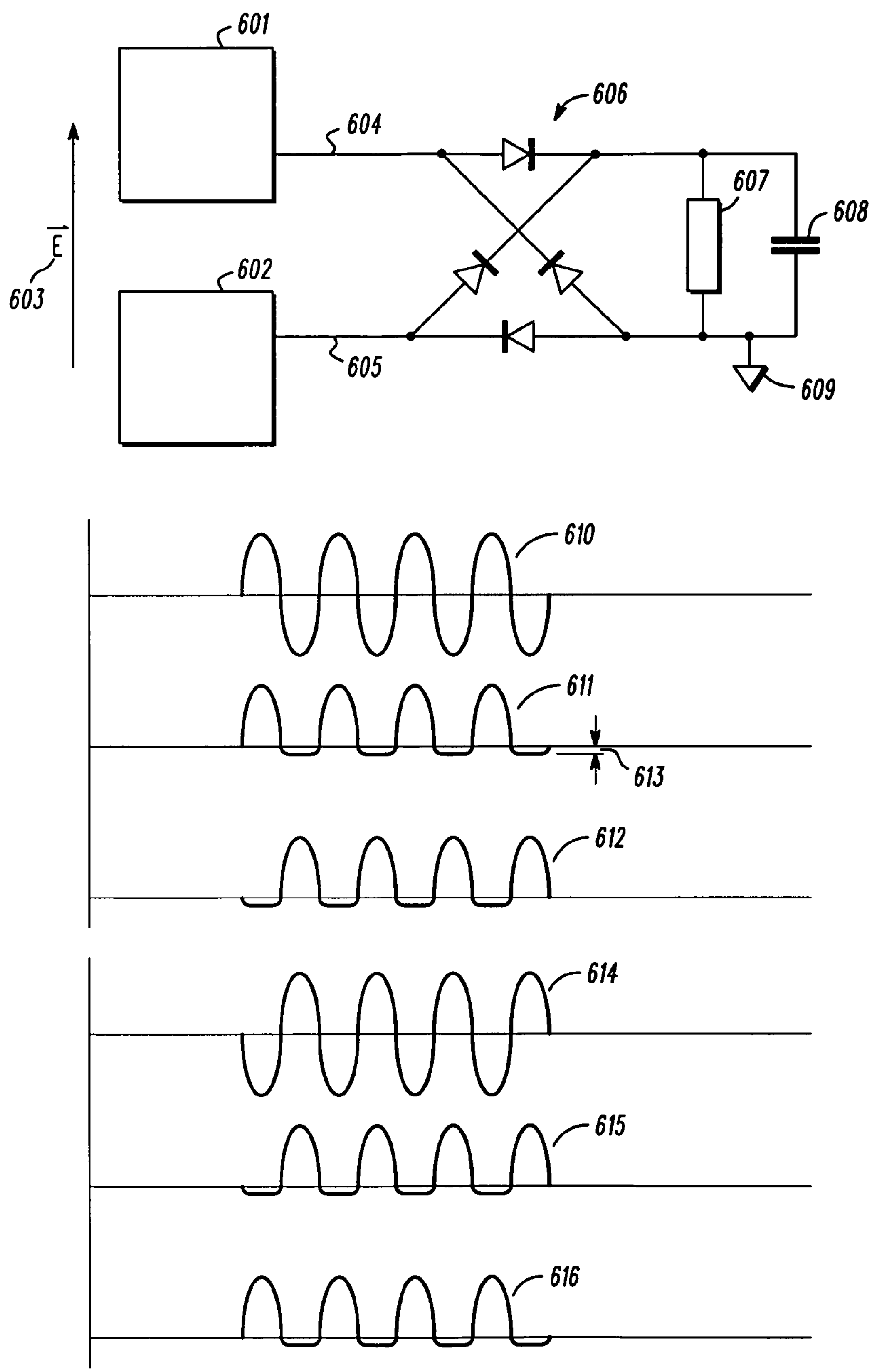
FIG. 6 illustrates antenna-node waveforms for a high-level model of a tag in accordance with the present invention.

FIG. 6 demonstrates orientation ambiguity by showing how the same E-field due to the reader power is processed on normal and inverted (in an orientation sense) tags. Tag antenna electrodes 601, 602 are immersed in E-field 603, and a voltage is induced between circuit nodes 604 and 605. This voltage is applied across the rectifier 606, which is loaded on the DC side by an energy dissipation element 607 (representing all of the analog and digital circuitry on the tag that draws power), and a energy storage element 608 that is the bypass or ripple capacitor. The local ground for the tag is 609 and is the common return point for all of the circuits on the tag.

For the orientation shown, the applied E-field is represented by the waveform 610. The clock signal can be recovered from either of the antenna connections 604 or 605. 611 is the waveform for the voltage between nodes 604 and ground 609. 612 is the waveform for the voltage between nodes 605 and ground 609. In both cases, the waveforms will not fall more than one diode drop (for a given injection current level) 613 below the local ground due to the structure of the rectifier. As can be seen from the waveforms, the rising edges of the two electrode voltages differ by 180°.

Now if the orientation of the tag is inverted in the field (or equivalently, the polarity of the applied E-field is inverted) as in 614, and the same waveforms are measured, the results are as shown in 615 for node 604 and 616 for node 605. Note that the rising edge of the clock extracted from 604 is 180° out of phase with the 604 clock signal for the previous orientation, and likewise for the clock extracted from 605. For a 125 kHz carrier system, this 180° phase shift corresponds to a 4 μsec difference. In this way, even items that are identically coupled and vertically oriented (but not necessarily in the same absolute sense) can be out of synch by 4 μsec.

The present invention deals with ways of preventing the above ambiguity problems. It also applies to cases where tag clocks and carrier frequencies are locally generated (on the tag). Both the power-on ambiguity and the orientation ambiguity can be solved by inserting a predetermined duration, consistently-timed (relative to the carrier zero crossings) synchronization gap within the reader transmitter waveform and placing one of two (or more) circuit embodiments (which will be detailed in the subsequent text) in the tag electronics. This method of signaling from the reader is only one embodiment of the invention, and those skilled in the art appreciate that there are other methods of signaling to the tags a synchronization event. This particular embodiment uses a form of on-off keying (OOK) or pulse width modulation (PWM) to signal back to the tag a synchronization event.

Figure 25:
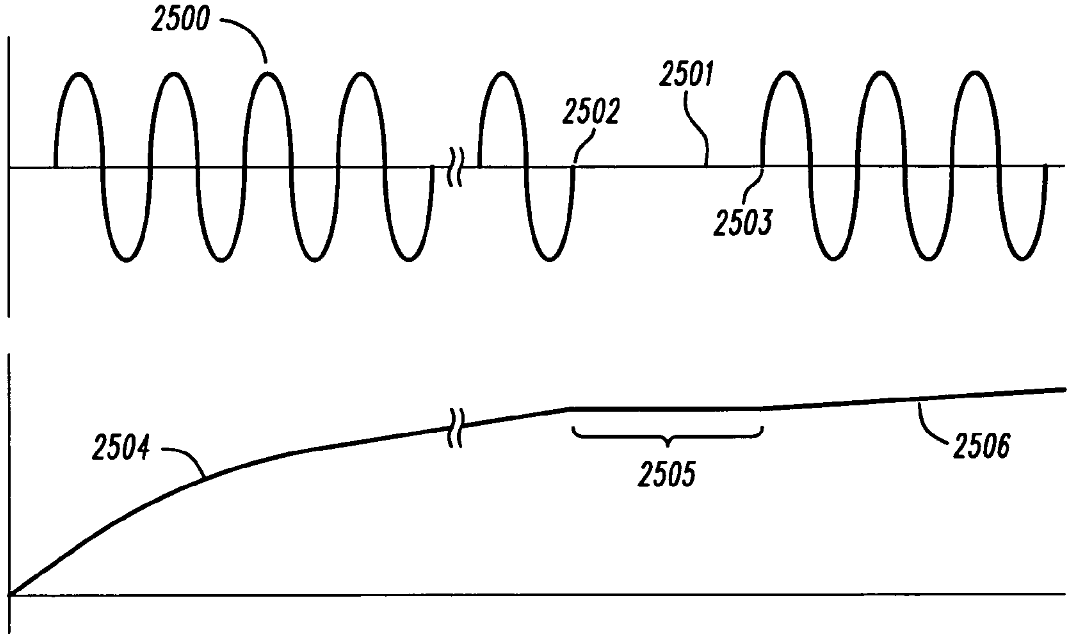
FIG. 25 illustrates a reader transmission waveform and the corresponding tag power-up transient waveform, in accordance with the present invention.

Inserting a gap that begins at a predefined phase of the reader clock, lasts for a predetermined duration, and ends at a predefined phase of the reader signal, gives the tags an absolute reference with which to orient themselves. (The duration of the gap is not critical provided it is not too long, since the tag is operating only with stored charge during this time.) This is shown in FIG. 25. In the preferred embodiment, the reader waveform 2500 has a gap 2501 that starts and stops at rising-edge zero crossings 2502, 2503. The gap is not inserted until a predetermined time has elapsed that allows the tag's bypass capacitors to fully charge up. Tag DC side waveform 2504 shows a typical charging transient. If the bypass capacitor is not fully charged, either because the initial transient hadn't settled or because some charge was removed during the gap time (since the tag is operating only off the charge stored on the capacitor during this time with the RF being turned off), the rise time on the tag at the end of the gap will take longer. But if the cap is fully charged, there is no time required to recharge the capacitor and the DC waveform essentially follows the reader waveform. Some charge will inevitably be drained from the capacitor during the gap since some circuits do have to operate during this time (in particular the synchronization circuits), but this amount of charge is very small compared to normal tag operation. The consequence of this is a slight droop during the time indicated in 2505. However, since this operating current draw is kept to a minimum, the amount of droop is small and the ensuing transient 2506 is not objectionable.

If clocks are extracted from both nodes 604 and 605, both phases of the clock are available for the tag to choose from. If the tag knows that the first edge after the gap will be a rising edge, the tag can choose the clock that provides the first edge as a rising edge. This eliminates any clock phase ambiguity that exists for tags that rely on the received or recovered carrier waveform for their clock source. Alternatively, the differential waveform between 604 and 605 may be full-wave rectified using a second, fast (e.g., not DC-side filtered) rectifier and then passing the rectified waveform through a frequency divide-by-two circuit to recover the original frequency at the proper phase. Either way, detection of the end of the synchronization event enables the tag to commence with the transmission of data, provided the predetermined conditions are satisfied. Both of these embodiments are further detailed in the following text.

Figure 26:
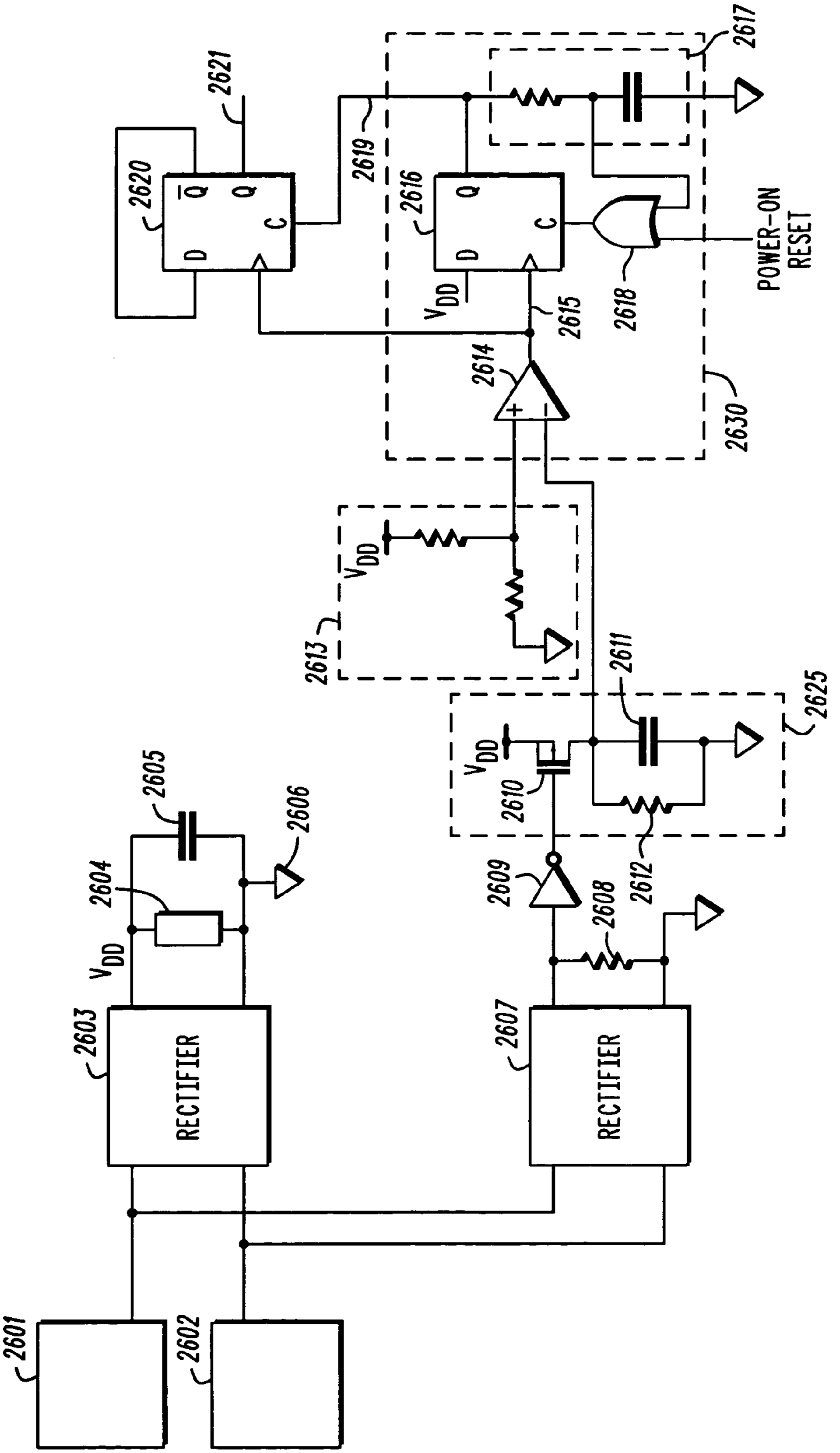
FIG. 26 illustrates an embodiment of a tag clock synchronization circuit that uses a second rectifier, in accordance with the present invention.

FIG. 26 shows the embodiment that uses the full-wave rectifier. Electrodes 2601 and 2602 serve as the antenna, and the differential signal that appears across these nodes is fed to fast rectifier 2607. The full-wave rectified waveform appears across load 2608. Buffer 2609 isolates the rectifier from the ramp generator that serves as a timer. The ramp generator consists of a charging element 2610, a p-channel MOSFET in this embodiment, that rapidly charges ramp capacitor 2611. This capacitor is discharged through element 2612, in this embodiment a large valued resistor used to set the discharge time constant. When this ramp falls below a threshold determined by resistive divider 2613, comparator 2614 trips and output 2615 triggers flip-flop 2616. The output 2619 of this flip flop is fed back to the clear through RC network 2617, which causes the output 2619 to be a one-shot short pulse whose duration is determined by the time constant. OR gate 2618 provides a reset path to initialize the flip flop at first power up. The one-shot output clears the (ambiguous) state of the divide-by-2-configured flip flop 2620 so that when the gap ends and 2620 starts toggling again, the flip flop output 2621 provides a known phase of the clock that is properly referenced for the intended orientation. Blocks 2603 and 2607 are rectifier circuits, and have similar form as block 606 in FIG. 6. Element 2604 is an equivalent load element, representing the impedance of the remaining analog and digital tag circuitry (which can be used to model the power dissipation of those circuits). Element 2605 represents the power supply bypass capacitor on the tag. The local ground for the tag is 2606 and is the common return point for all of the circuits on the tag. Note that all of the above circuits form only one possible embodiment of the invention. Those skilled in the art appreciate that many possible forms of synchronization circuits exist that do not depart from the spirit of the invention.

Figure 27:
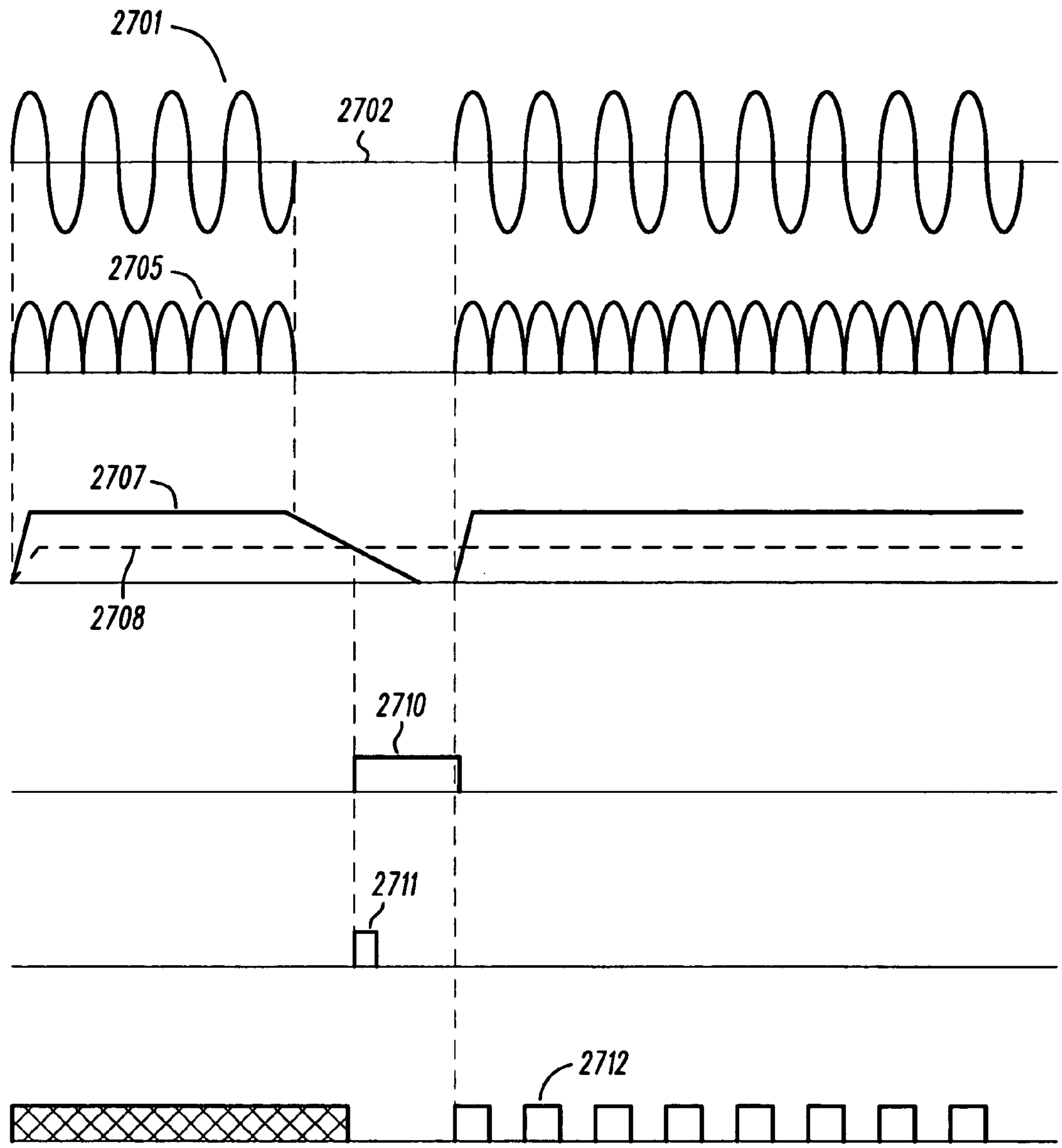
FIG. 27 illustrates the waveforms of a tag clock synchronization circuit that uses a second rectifier, in accordance with the present invention.

The waveforms for this circuit are shown in FIG. 27. 2701 is the reader transmit waveform with gap 2702. Note the gap begins and ends on a rising-edge zero-crossing. 2705 is the fast rectifier 2607 output, and is also the waveform that appears at 2610. 2707 is the ramp generator output and 2708 is the threshold 2613. 2710 is the comparator output 2615, and 2711 is the one-shot output 2619, which is used to clear the divide-by-two flip flop 2620. 2712 is the output of 2620, and is the final, properly phased clock to be used for all subsequent timing.

Figure 28:
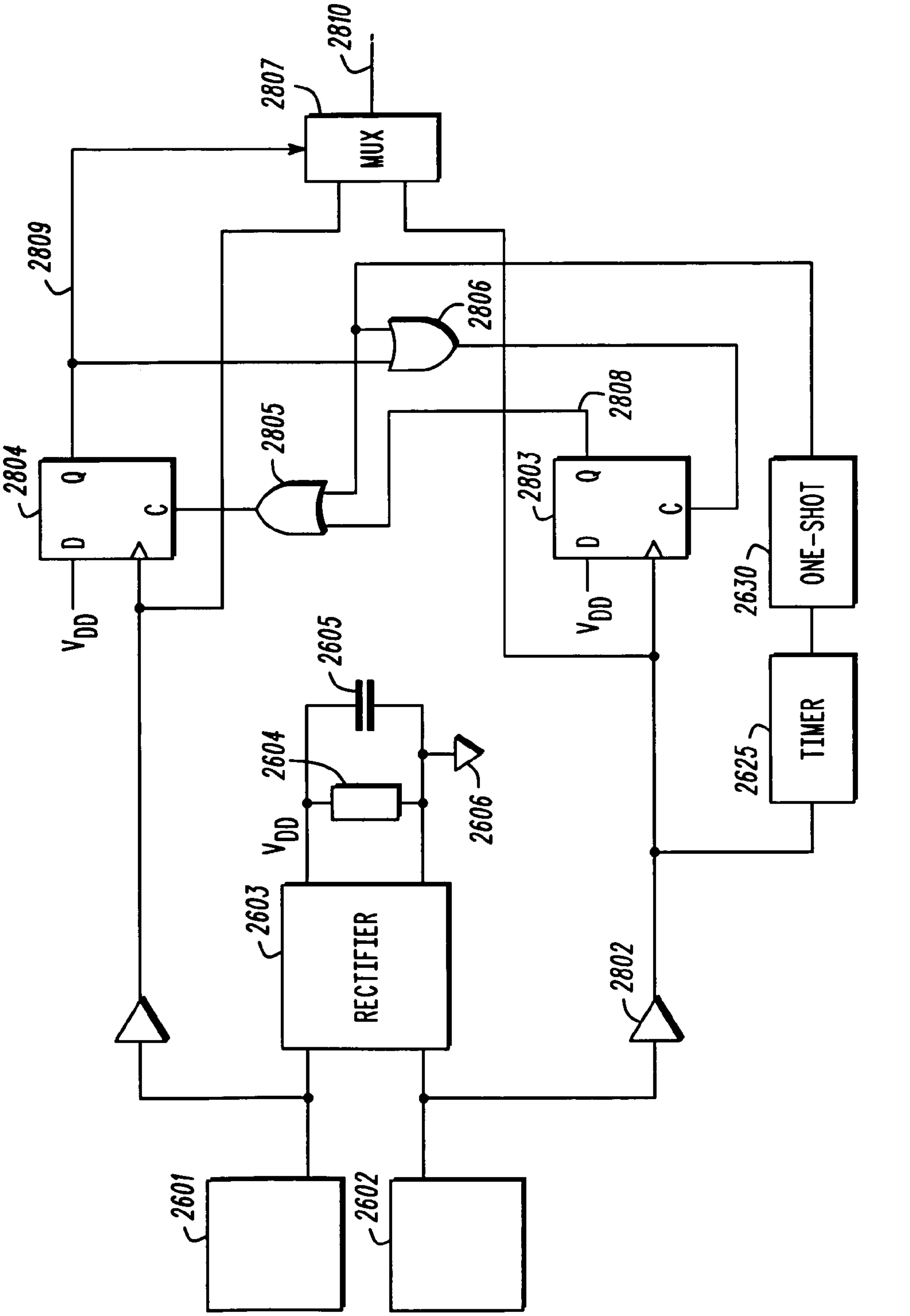
FIG. 28 illustrates an alternate embodiment of a tag clock synchronization circuit that selects the desired clock phase from a set of phases, in accordance with the present invention.

FIG. 28 shows an alternate embodiment of the tag circuit that uses one more flip flop and several more gates than the previous embodiment but doesn't have a second rectifier. The elements that are the same as those in FIG. 26 are so labeled. A clock from each electrode is buffered and drives the timer lineup 2625, 2630 and latches 2803, 2804. A rising edge at either of these latches sets that latch. The one-shot output clears the latches from the initialization burst prior to the gap through OR gates 2805, 2806. When the first rising edge in time appears (which is also the true first rising edge since the reader transmits a rising edge after the gap), that flip flop latches first, and its set output is applied to the other flip-flop's clear input through the OR gates, so that the rising edge on the improper phase is kept from latching it's flip flop. The output of either latch (2808, 2809) can be used to control the multiplexer 2807 that passes the proper clock phase 2810 to the remaining circuitry.

Once the tags have available to them a common phase of the system clock (the reader carrier in the preferred embodiment) as provided by the circuits disclosed in FIG. 26 and/or FIG. 28, they will all be operating off of an absolute reference edge and will therefore have synchronized timing. In general, once the common system clock phase has been determined, the tags will derive a symbol or chip clock from the system clock to time their transmissions, typically by dividing down the clock by an integer ratio. Other synchronization embodiments can be envisioned. For example, in cases where the carrier frequency is very much higher than the symbol clock, a high-frequency divider may consume a prohibitively large amount of current. In such cases, it may be more efficient to utilize a locally (i.e., resident on the tag) generated symbol clock with a free-running but synchronizable oscillator. In such cases, the local symbol clock (e.g., an RC oscillator, well known in the art) could be started at a given starting phase (initial condition) based on some characteristic of the synchronization event, e.g., the end of the gap.

The previous paragraphs detail a passively powered tag system, where the reader signal not only provides the timing but also the power source for the tag. Other embodiments or applications could call for tags that are self-powered (e.g., with local batteries). Such tags would not require the presence of the reader carrier to provide power, and in such cases, the synchronization event could be the presence of a carrier pulse as opposed to the absence of a carrier pulse. It could also be envisioned that two carrier gaps could be separated by a short burst of carrier, where the characteristics of the short burst of carrier serve as the synchronizing event.

Returning to the passively powered system as referenced above, the tags 110, 120, 130 in the described system transmit their data using a multiple pass transmission algorithm. The multiple pass transmission algorithm is critical in determining the total reading time of the tags 110, 120, 130, and consists of several different aspects. The general idea employed in the algorithm is that each tag 110, 120, 130 will choose a particular (preferably a uniform random) channel for communications in each algorithm pass.

In the preferred embodiment of the described system, the channel selection 240 is typically based directly on the data 220 stored on the tag 110. The tag 110 will then typically transmit its information (i.e., identification data) in the preferred embodiment on the chosen channel, until the next pass of the algorithm, at which time it will choose a new channel and repeat the process. The transmissions of the tags are assumed to be roughly synchronized (by virtue of the first predetermined transmission condition) in the preferred embodiment of the invention.

The channel selections by each of the tags are based upon predetermined information (i.e., determined either at tag programming 230 in typical embodiments, actual data gathered by the tag, or possibly in the design of the tag itself). In the preferred embodiment of the present invention, the channel selections of each tag 110 are determined (in an algorithmic manner) directly from the identification data 220 that is stored on the tag 110 (as further described below). Also note that in other embodiments, the predetermined information above can include pseudo-randomly generated numbers not directly based on the data stored on the tag 110, as long as the sequence can be derived in some manner in the reader receiver.

As fully described in Section I above, and a key for good system performance, the preferred embodiment of the described system requires that at least a portion of the data 200 (e.g., EPC, CRC, etc.) be pre-randomized (or scrambled) 211 before storing it 230 on the tag 110. Since the tag 110 essentially uses the stored data 220, or a portion thereof (e.g., 221, 222) to select 240 a communications channel in each pass of the multiple pass algorithm, it is crucial that the data 220 appear to be uniformly random for the best overall system performance. This is accomplished through a low complexity reversible scrambling algorithm 211 that is described in Section I above.

Figure 12:
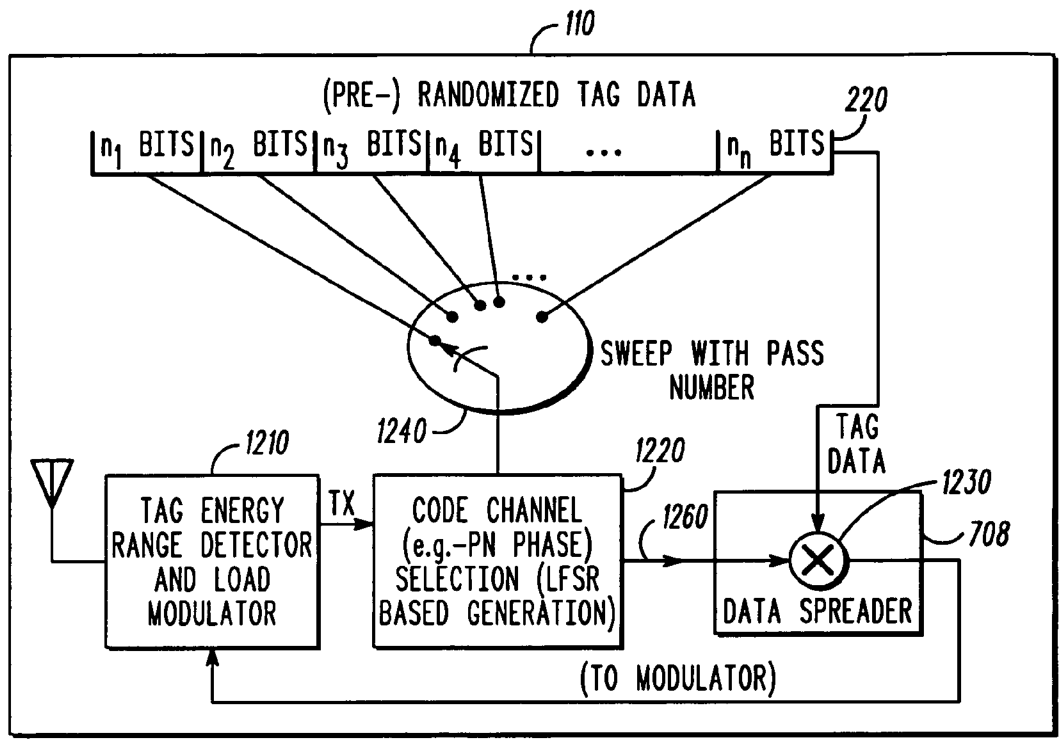
FIG. 12 illustrates a simplified tag circuitry functional block diagram highlighting the pass dependence and modulation method in accordance with the invention.

In particular, as illustrated in FIG. 12, the channel selection process 240 in each of the multiple transmission passes in the preferred embodiment is carried out by utilizing a predetermined subset (e.g., 221, 222, 223, 224) of the pre-scrambled (i.e., randomized and stored) data 220 to select the communications channel 240 in each pass. A channel selector 1220, such as a commutator or multiplexing device 1240, typically selects a channel. A new subset 221, 222, 223, 224 (i.e., a new random number draw) of the data stored on the tag 220 is typically utilized for channel selection in each subsequent pass of the algorithm, ensuring a random and independent selection of channels throughout the multiple pass transmission algorithm.

Note that the tag 110 may transmit all of its data 220 in each algorithm pass (as in the preferred embodiment), or only a portion of the data (i.e., generally enough data is transmitted to determine the channel utilized by the tag in the next pass). Typically, the portions 221, 222, 223, 224 of the data that are utilized for the channel selection in each pass of the algorithm are unique and contiguous sections of the data 220, preferably pre-randomized, though these conditions are not strictly required. A particular selection of channels for passes of the multiple pass transmission algorithm is termed a 'channel selection profile'.

For example, in a system with 128-bits of pre-scrambled identification data 220 stored on each tag, unique but sequential sections of 8-bits may be utilized to choose one of 256 (i.e., $2^8$) channels in each of 16 (i.e., 128/8) algorithm passes. Thus, the first randomized byte of data (e.g., 221) for each tag chooses 240 the communications channel for each tag, respectively, on the first pass of the algorithm, the second (and hopefully different) byte (e.g., 222) of randomized data for each tag is used to choose 240 the channel for transmission on the second pass of the algorithm, and so on. This multiple transmission pass process continues until all of the data stored on the tag is exhausted (e.g., the 16th pass is completed in this example; in FIG. 2, this would correspond to 224), or the reader 100 signals the tags to stop transmitting (generally sensed in the tag 110 by the second predetermined condition being met in 704 (1210) as described above). Once the data is exhausted, the whole process may optionally be repeated, though the tags will typically choose the same (deterministic) channels. Note once again it is desirable to choose a random and uniquely determined channel for each algorithm pass for each tag in order to randomize the collisions that will inevitably occur (see further details in Section V below).

Of course, those skilled in the art recognize that other (e.g., non-contiguous or not completely unique) sections of the data may be used to either directly or indirectly select the communications channel in each pass. In this manner, it is possible to extend the maximum number of algorithm passes before the channel choices repeat, virtually without limit. The channel selection profile (or channel choice algorithm) may be modified after some number of transmission passes, such that a different subset of the same data 220 is utilized for later channel selections 1220 (in order to extend the unique channel choices before any repetition of the pattern occurs). For instance, after 16 passes of the multiple pass transmission algorithm, the tags may shift the channel selection data (i.e., the predetermined data) by n-bits (where n=1 . . . 8 for the above example) to arrive at new channel selections for subsequent passes of the algorithm. In this manner, it is possible to extend the number of unique channel choices practically without limit, though the tag circuitry complexity is increased.

Yet other embodiments of the channel selection algorithm may also apply some type of mapping (generally one-to-one look-up table, or other algebraic or logic) function to determine the channel choices from the (generally limited) data stored or programmed on the tag. The only key characteristic of the channel selection process is that the channel choice be computable in the reader 100 once some portion of information is known about the data in the tag.

Since the channel resources are limited (i.e., there are a limited number of available channels for each user to select in each pass of the multiple pass communications algorithm), there will inevitably be collisions among the transmitting tags. A collision is defined as the case where two or more tags choose to communicate on the same channel during a particular algorithm pass. This situation is to be expected under normal system operation. For example, for a typical case of twenty-five tags communicating over 64 channels, the probability that there is at least one collision is 99.6% per pass. This is based on the fact that, for M tags communicating over N channels, the expression for the probability of no collisions is (for M<N)

$$\Pr\{\text{no collision}\} = \frac{N!}{(N-M)!} \cdot \frac{1}{N^M}$$

Several numerical examples of colliding tag transmissions and their remedies are discussed below in Section V—Collision Mitigation Methods.

In many cases, the number of tags present in the system (at a particular power-on level) may even exceed the number of available channels (especially on earlier passes of the preferred embodiment algorithm, or when the number of available channels is set low as described below). This situation is completely acceptable in the present invention when orthogonal channelization means are utilized. Note that typical DS-CDMA systems (using quasi-orthogonal channelization codes) would be considered overloaded at that point, and reliable communication could not take place (especially without further knowledge of the tags' transmission characteristics). Importantly, in the described system, the activated tag population can effectively be further reduced by collision mitigation techniques, which are fully described in Section V below.

Also importantly, the preferred embodiment of the described system utilizes a variable number of channels per pass (generally determined by 221, 222, . . . 224) of the multiple pass transmission algorithm in order to improve overall system performance (e.g., total reading time, total system capacity, reliability, etc.). In other words, the number of available channels in one pass of the multiple pass transmission algorithm could be different from the number of channels available in another pass of the transmission algorithm. The variable number of channels per algorithm pass (i.e., per unit time) is also termed a dynamic channel profile in the present discussion, since the number of available channels changes dynamically with time. Implementing the dynamic channel profile essentially optimizes the total transmission time (or total reading time) for one or more expected tag populations.

Note that the transmission time for each pass of the algorithm is typically proportional to the number of channels available for that pass of the algorithm (regardless of the channelization method that is utilized). The total transmission time ($T_{TX}$) for the multiple pass transmission algorithm can be expressed as $$T_{TX} = \frac{1}{R}\sum_{i=1}^{L} N_i * B_i$$

where L is the number of transmission passes that are required to successfully transmit the data, R is the transmission (signaling or channel symbol) rate, $B_i$ is the number of data symbols that are transmitted per pass, and $N_i$ is the number of channels available (or spreading gain) in the $i^{th}$ pass of the algorithm. Note that in one embodiment of the described system, L can be equal to 16 passes (allowed), $B_i$ is fixed at 128 bits, R is equal to 62.5 KHz, and the particular $N_i$ values are given in the example above, though this is only one particular embodiment of the system. Many other signaling rates and data formats are possible, as are many different carrier frequencies for transmitting the information. Recall that the number of channels available per pass ($N_i$) generally depends on the number of bits utilized to select a communications channel in each pass ($n_i$) as follows (as also shown in 240):

$$N_i = 2^{n_i}$$

In the preferred embodiment of the system, $N_i$ represents the spreading gain and number of available code phases per pass, and R is the signaling rate in chips per second. Note that not all possible channels need to be utilized in a given transmission pass, though it is desirable to make all channels available for data transmission. The application of advanced collision mitigation techniques (described in Section V below) can greatly reduce the required number (L) of transmission passes from the tags 110, 120, 130. In general, there are no restrictions on any of the values in the above equation in other embodiments of the described system.

Since the transmission time per pass is dependent on the number of channels per pass (and the symbol rate) in the preferred embodiment as shown above, the system's total reading (i.e., acquisition) time performance can be improved for a small number of tags by using a smaller number of channels in earlier passes of the multiple pass transmission algorithm (since adding more channels to the system in such a case would be of little additional benefit for small numbers of tags). The number of channels may be increased in later passes of the algorithm (potentially in multiple steps) to accommodate cases where larger numbers of tags are present in the system, or cases where the communications channel is poor, and the reader 100 does not employ the more sophisticated signal processing (e.g., advanced collision mitigation) techniques referenced in Section V below. Increasing the spreading gain increases the system's immunity to other noise or interference sources, which also increases system robustness (allowing it to operate successfully under a variety of communications channel conditions).

In this manner, systems with a small number of tags present would typically not be penalized by the longer transmission time of systems with a larger number of (earlier) channel choices, while at the same time systems with a larger number of tags present would also not be significantly penalized (since earlier passes of the multiple pass algorithm also typically take a much shorter time due to the smaller number of channels available initially). Also, increasing the number of channel choices in later algorithm passes ensures that systems with a large number of tags present will successfully acquire all of the data in a limited number of algorithm passes (thus increasing system reliability).

For example, a preferred embodiment of the described system utilizes 128-bits of data 220, with 32 channels in the 1st and 2nd algorithm passes, 64 channels in the 3rd and 4th algorithm passes, 128 channels in the 5th through 8th passes, and 1024 channels in the latter 8 algorithm passes. Note once again that unique subsets of the data 220 are utilized to directly choose 1220 the communications channel 1260 in each pass in this embodiment, resulting once again in a total of 16 algorithm passes before unique, non-overlapping portions of the data are exhausted. Other embodiments of the system may utilize a variable number of channels per transmission algorithm pass that changes after a predetermined number of passes. For instance, the first sixteen passes of the multiple pass transmission algorithm in the above example may utilize anywhere from 32–256 available channels (i.e., five to eight-bits of channel selection data), while the next sixteen passes may utilize anywhere from 256–4096 available channels (i.e., eight to twelve-bits of channel selection data). In this manner, the dynamic channel profile (or number of available channels per algorithm pass) may be extended virtually without limit. Also note once again that the maximum number of passes may be extended by utilizing overlapping or interleaved portions of the data to drive the channel selection algorithm.

The actual choice of the number of available channels per algorithm pass (also called a dynamic channel profile) in a particular embodiment of the system may also depend (in addition to the expected number of tags present in the system) on the expected or predominant type of signal processing algorithms (such as the type of collision mitigation algorithms) utilized in the reader 100.

Specifically, in the preferred embodiment of the described system, the random channel choices are utilized to select a particular spreading code (or code channel in 1220) in each pass of the multiple pass transmission algorithm. More specifically, in the preferred embodiment, portions of the data 220 stored/programmed on the tag 110 are used to directly specify a time offset (or code phase as in 1220) of a length-N specially augmented m-sequence (where N is equal to the number of channels in a particular algorithm pass, as described above). Note that spreading codes may also be complex valued, without any loss of generality. This process is shown schematically in FIG. 11. Different phases of a PN sequence are commonly obtained by applying a masking function (or AND-XOR reduction network 1100) of the PN generator (LFSR) state, which effectively performs a modulo-2 sum of two or more m-sequences to produce a third code phase of the same m-sequence. Thus, all of the tags 110, 120, 130 use the same basic LFSR (m-sequence) generator in each algorithm pass, beginning with the same initial generator state in the preferred embodiment, such that all of the tags 110, 120, 130 transmissions are synchronized to a known basic initial generator state. These aspects are key to quick and effective demodulation in the reader 100, as described in Section IV below. Note that the basic LFSR sequence generator length (i.e., primitive polynomial) typically changes dynamically (changing the number of channels) per algorithm pass, as described above.

The traditional m-sequence generators are typically made to be specially augmented PN sequence generators by forcing a zero output for the first chip (or PN bit) time in the preferred embodiment, ensuring that the cross-correlations of the sequences from different tags will be zero over a given sequence period. Note that other types of orthogonal function generators could be used in the place of the LFSR PN generators (e.g., Walsh or Hadamard functions) in other embodiments, though such codes would not have as desirable interference rejection capabilities. The data 220 stored on the tag 110 is then spread by the generated spreading codes 1260 by traditional means 1230 (e.g., an XOR gate in digital implementations, or a multiplier in analog implementations, as is well known to those skilled in the art). The spread data signals of the activated tags are then sent (in aggregate) over the given communications channel.

Note that the tags could employ a range of modulation types to transmit their data (e.g., amplitude modulation, phase modulation, frequency modulation, or some combination thereof). The preferred embodiment of the system utilizes a form of amplitude shift keying ("ASK") from load modulation via transmission element 702, though other modulation types and implementations are certainly possible (e.g., Differential Quadrature Phase Shift Keying, Quadrature Amplitude Modulation, Pulse Code Modulation, Pulse Amplitude Modulation, Pulse Position Modulation, etc.). The use of many different carrier frequencies for transmitting tag information are possible, ranging from tens of kilohertz to several gigahertz (e.g., 125 KHz, 13 MHz, 900 MHz, 2.4 GHz). The employment of a variety of data encoding and mapping techniques is also possible with the described system. Some examples of encoding techniques include, but are not limited to, return to zero (RZ), non-return to zero (NRZ), Manchester, and differential encoding, which are all well known in the art. Note that it is possible to use many different encoding, modulation, coding and signaling types in the invention without loss of generality, as is known to those skilled in the art. Some examples of coding techniques include CRC codes, convolutional codes, block codes, etc., which are also all well known in the art.

The tags 110, 120, 130 in the preferred embodiment also directly modulate the carrier supplied by the reader 100 via transmission element 702; thus, they have no local oscillator (though the use of a locally generated carrier is certainly possible within the scope of the described system, and does not in any way limit its application). In the preferred embodiment of the described system, power converter 703 rectifies the carrier signal from the reader 100 so that the reader 100 remotely powers the circuitry on the tag 110. Note that the use of actively powered tags is also possible and does not in any way limit the use of the present invention. A general goal of the system is to minimize the complexity of the tag 110, and through the use of the described techniques in the preferred embodiment, the circuitry on the tag 110 can be kept to a minimum.

IV. Fast Demodulation Methods

Figure 13:
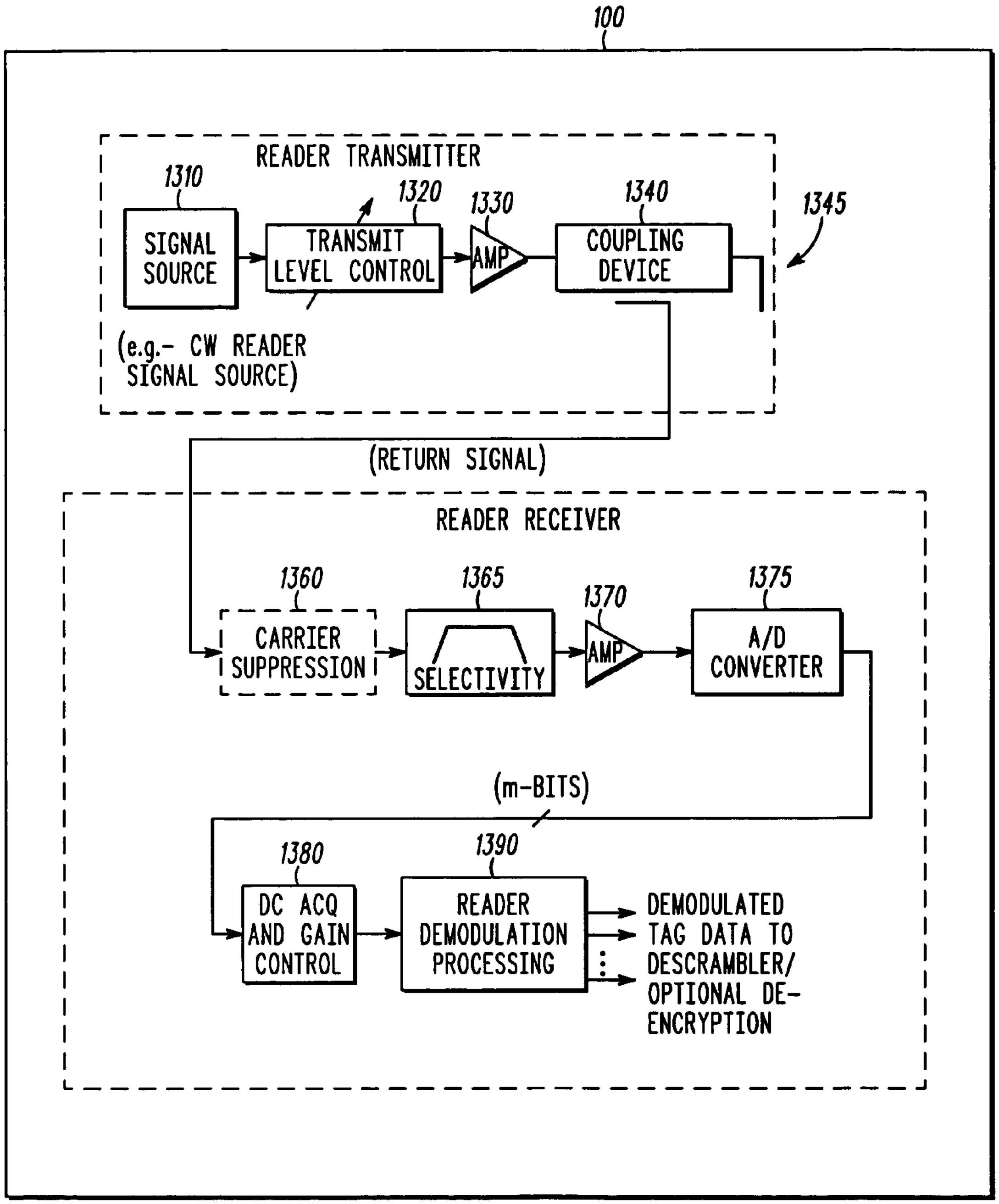
FIG. 13 illustrates a detailed view of the reader block diagram in accordance with the present invention.

The reader is responsible for performing many important signal processing steps. As shown in FIG. 13, the reader 100 typically begins the reading process of the tags 110, 120, 130 by initializing the output of a signal source 1310 with a transmit level control 1320 and amplifier 1330, and transmitting power at some minimum level. The reader 100 then begins transmitting a continuous wave at that level in the preferred embodiment. Once the reader 100 is transmitting at a particular power level, it typically listens (via the coupling device 1340 and antenna 1345) for any return signal from the tags 110, 120, 130. This activity detection may take the form of a modulation or energy detection measurement, such as detecting signal levels or signal swings in each of the possible communications channels (which is further described below). It is desirable to make this measurement and characterization period as short as possible, so if no tags are activated at a particular power level, the reader 100 can rapidly step (generally in an increasing manner) to the next power level. If signals are sensed at a particular transmit power level, the reader 100 may begin the full demodulation processing 1390 (possibly employing collision mitigation techniques, as discussed in Section V below). Note that the reader 100 may also send out modulated carrier signals, synchronization pulses, or asymmetric carrier waveforms in other embodiments of the system without loss of generality.

The signal processing performed by the reader 100 can be performed in either hardware or software architectures, or some combination thereof. Typical embodiments will include some selectivity 1365, amplification 1370, analog-to-digital conversion 1375, and DC acquisition and gain control functions 1380.

In general, the reader 100 may also perform active or passive suppression 1360 of its carrier signal in certain embodiments, and interference or noise cancellation (for any form of interference from sources other than the desired tags in the system).

As stated above, the preferred embodiment of the present invention utilizes spread spectrum modulation in the tags 110, 120, 130. Thus, the received data must be despread in the reader 100 for each code channel by first reverse-applying each possible spreading code (or the complex conjugate of each complex spreading code), as is well known in the art.

More specifically, because the preferred embodiment of the described system utilizes specially augmented m-sequences as spreading sequences in the tag 110, very fast and efficient demodulation (i.e., despreading and channelization) techniques can be utilized in the reader demodulation processing 1390. These techniques substantially reduce (e.g., by about a factor of 57 in the preferred embodiment) the processing power required in the reader demodulation processing 1390, which results in faster reading times and lower cost implementations of the reader 100. The actual processing savings will depend on the number of channels employed in each pass of the multiple pass system, and can be expressed in terms of a factor (F) which is equal to the ratio of the number of traditional despreading operations to the number of improved despreading operations per symbol (using a combination of received sequence re-ordering and Fast Hadamard Transforms (FHTs)):

$$F = \frac{1}{L}\sum_{i=1}^{L}\frac{(N_i)^2}{N_i * \log N_i} = \frac{1}{L}\sum_{lpasses}\frac{N_i}{\log N_i},$$

where L is equal to the number of passes required to successfully demodulate the source data, and $N_i$ is (once again) equal to the number of channels in the $i^{th}$ pass. This factor directly represents a processing savings (which is typically expressed in terms of millions of operations per second (MOPS) or millions of instruction per second (MIPS)) in the reader demodulation processing 1390. Thus, in this example, a processor 1390 that is fifty-seven times less capable (e.g., 10 MOPS vs. 570 MOPS) may be utilized in the reader 100 in the preferred embodiment in the best case (with no collision mitigation as described below).

Recall that specially augmented m-sequences (shown in box 1120 of FIG. 11) are an orthogonal extension of traditional PN sequences, which have some similarities to orthogonal Walsh codes (shown in box 1420 of FIG. 14); namely, the two sets of sequences have the same number of binary ones and zeroes in the sequence (i.e., they are of equal weight). In fact, the two types of sequences (i.e., length $N_i$ specially augmented m-sequences and Walsh sequences) are related through the use of a single special re-ordering function. This special re-ordering function is derived directly from the primitive polynomial that is used to generate the base m-sequence (as is shown in the tag sequence generator 1110) in reader receiver block 1520 of FIG. 15. The sequence re-ordering function 1510 is used to directly re-order the data samples (or elements) as the receiving device 1375 receives them, as fully described below. The receiving device 1375 could be an analog to digital converter, an analog sample and hold device, a register, or any other device that receives a signal. Note that a single sequence re-ordering 1510 function is applied to the composite received signal, which consists of transmissions from several different tags 110, 120, 130 using multiple code channels (or code phases as in 110).

Once the composite received signal (consisting of several m-sequence code phases) has been re-ordered in a storage medium, such as a memory buffer 1530, it resembles sequences from a set of valid Walsh sequences, and fast transform techniques, such as a Fast Hadamard Transform (FHT), may be utilized to rapidly (and concurrently) despread the data from the tag 110 for all data channels (as shown in 1540). FHTs are used to rapidly correlate data sequences against a complete set of Walsh codes (in parallel), as is well known in the art. Any transform related to FHTs (e.g., Fast Walsh Transforms, Walsh-Hadamard Transforms, recursive Walsh transforms, etc.) may be utilized with the described fast correlation methods without departing from the spirit of the described system. Also note that all of the described processing techniques can be performed in either the analog or digital signal processing domain.

Figure 14:
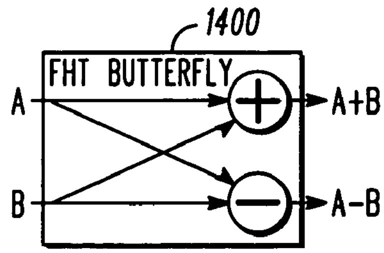
FIG. 14 illustrates an example of fast transform methods for Walsh coded signals in accordance with the invention.
Figure 14:
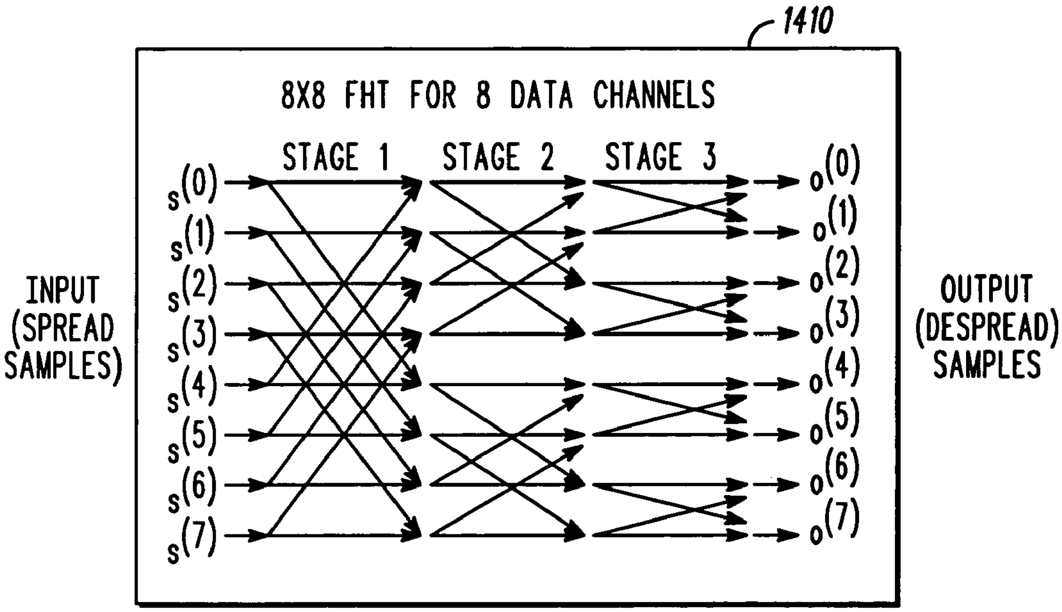

Note that traditional FHT algorithms (e.g., as shown in box 1410) are well known, and their basic kernel operation (box 1400, termed a 'butterfly') is shown in FIG. 14. A radix-2 FHT butterfly is similar to a radix-2 FFT butterfly, though it consists of multiplying the data elements by only a +1 and −1 value (or equivalently adding and subtracting the data values together). The trellis structure 1410 of an 8×8 FHT is also shown. Each output of an FHT 1550 is termed an FHT bin or FHT code channel. A N-point FHT effectively correlates against all possible length N orthogonal Walsh sequences when completed. In the preferred system, this is equivalent to correlating against all possible code phases for a length N sequence. Since the FHT is a fast transform, it can be shown that the processing savings over traditional correlation (similar to the factor F expressed above) is equal to ($N^2$/N log N) for an N-point orthogonal sequence. This same savings is realized by utilizing the described fast correlation techniques.

The exact received data special re-ordering function 1520 is determined by observing the states that the tag Fibonacci LFSR (as shown in 1110, or its equivalent) cycles through during normal operation (also refer to the example below). The states that the LFSR progresses through correspond directly to the special re-ordering function, or the indirect addresses that the incoming (spread) received data samples must be stored at in the received data memory buffer (1530 or other storage medium) as they are received (linearly) in time. This sequence of addresses (in 1520) may alternately be stored in a storage medium (e.g., Random Access Memory, Read Only Memory, Hard Disk Drive, etc.) instead of being actively generated in the receiver. Note that these sequences need only be generated once for each base spreading code (i.e., primitive polynomial) utilized in the system. In this manner, the elements of the received m-sequences (or sums of m-sequences) are re-ordered such that they now represent exactly the elements in Walsh sequences (or more specifically, the rows in a Hadamard matrix). Thus, a traditional fast (Hadamard) transform (correlation) method may now be utilized (in 1540) to effectively despread the received data channels in parallel. Note that the data sequences can also be double buffered in memory to accommodate any processing latency.

Figure 17:
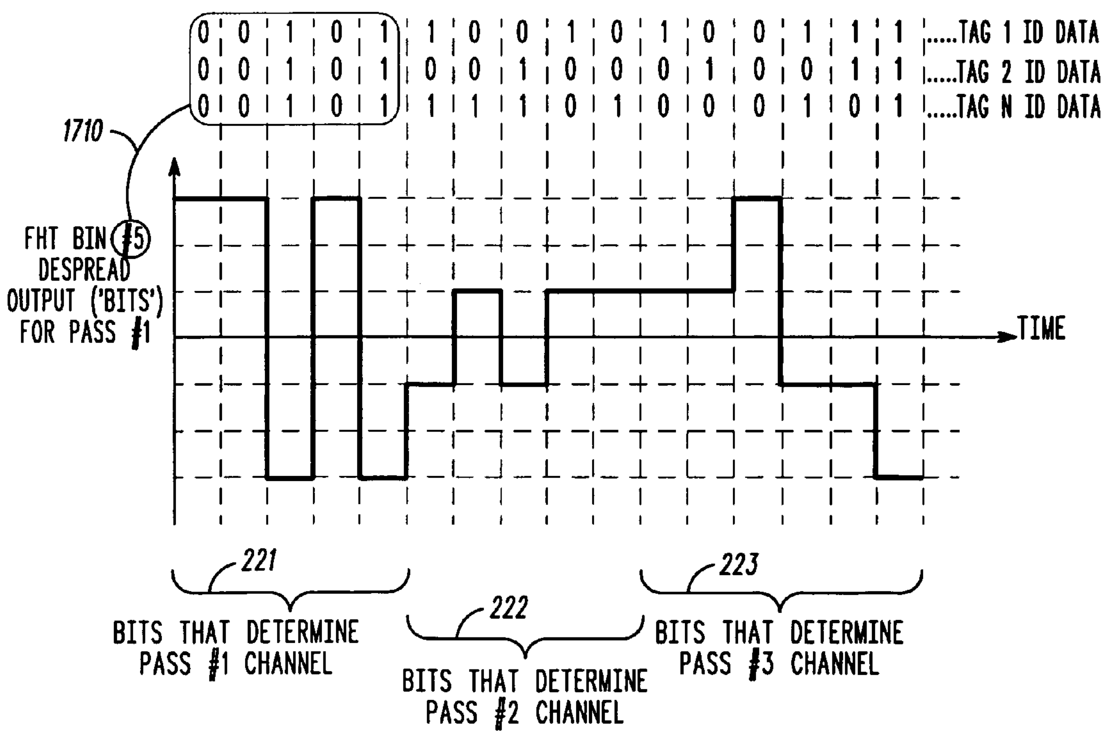
FIG. 17 illustrates an example waveform in the presence of a collision in accordance with the present invention.

The output indexes (or bins) 1550 of the FHT that exhibit signal energy correspond directly to the mask values 1130 (when expressed in binary) that were used in the AND-XOR reduction 1100 in the tags 110, 120, 130. For example, the channel selection code 1130 (the 'c0–c4' shown in FIG. 11) (transmitter processing) directly corresponds to the active outputs 1550 of the FHT block 1540 in FIG. 15 (receiver processing). Recall that the binary mask value 1130 is applied in the tag 110 to select a particular code channel (or code phase). This is also shown in FIG. 7, where the mask 710 is drawn from the tag data 240 to input to the channel selection 240. That is, the binary mask value 1130 (and FHT bin index) directly corresponds to the data 221, 222, 223, 224 stored on the tag 110, that was utilized to select a channel during a particular pass (see also identifiers 1710, 1820, 1830 and 1840 in FIG. 17 and FIG. 18 for a supplementary demonstration of how tag data relates to the channel choice). Each tag 110 will send its data 220 over a fixed channel 1260 for the duration of each of the passes of the multiple pass algorithm in the preferred embodiment. The output signal level at each FHT bin corresponds directly to the signal level on each code channel 1260 (e.g., for each code phase) after despreading. Thus, the composite received signal has effectively been channelized into its constituent components at the output of the FHT.

Figure 18:
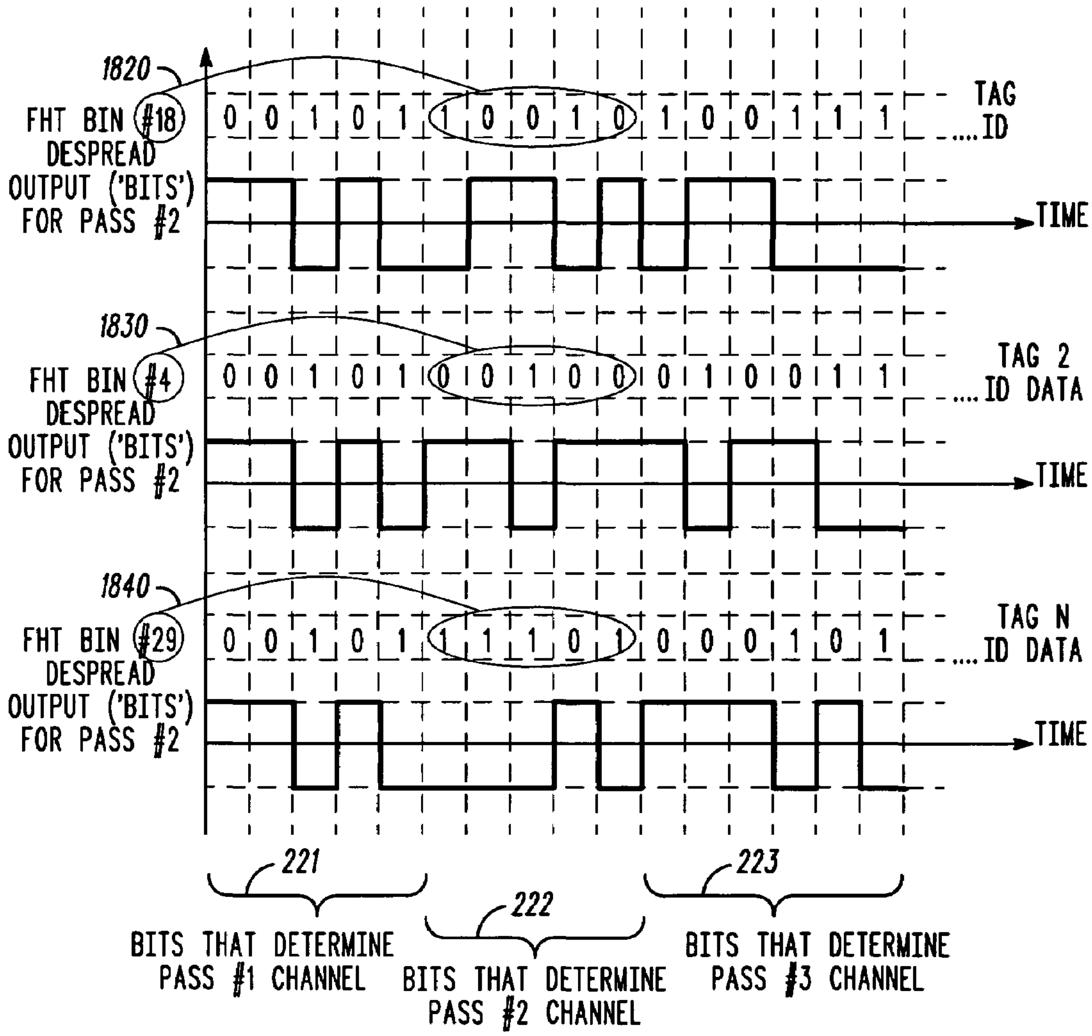
FIG. 18 illustrates several example waveforms in the absence of collisions in accordance with the present invention.

As further discussed below, the data signal 1550 at the output of each active FHT bin during the channel selection portion of the received data sequence can be verified by matching it up with the binary FHT index value (since the two sequences should match for valid data). This technique enables a crude form of additional error detection, and is shown in FIG. 18 for Pass #2 of the multiple pass transmission algorithm. Note that the data sequence 1820, 1830, 1840 over the portion 222 used to select the channel 240 for the second pass is the binary equivalent of the FHT bin number.

Figure 15:
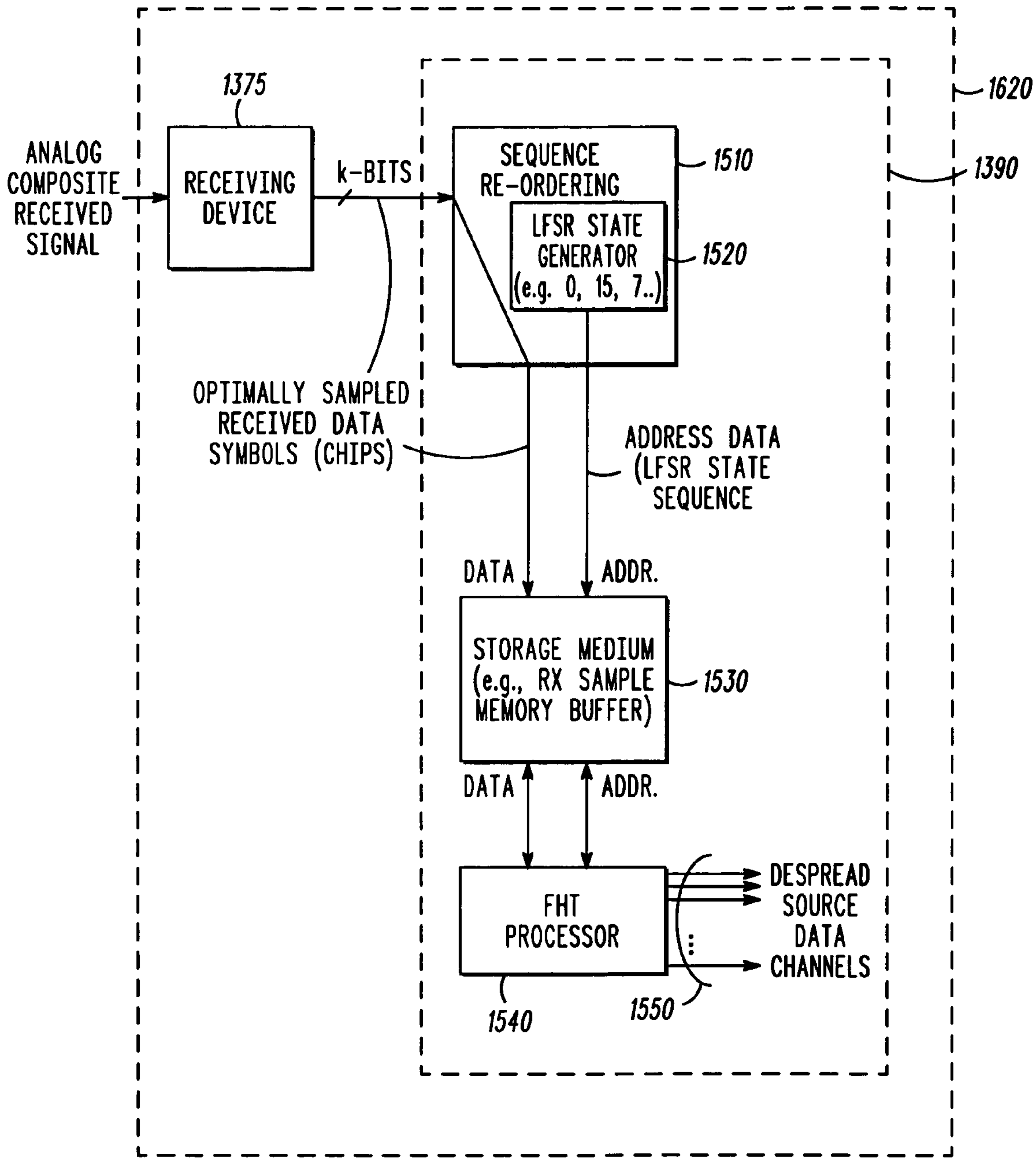
FIG. 15 illustrates a detailed example of the reader receiver signal processing for fast correlation of pseudonoise sequences in accordance with the invention.

Through the combined re-ordering and FHT technique shown in FIG. 15, the demodulator is able to rapidly demodulate (i.e., despread) all possible code channels (i.e., code phases) in the preferred embodiment. Note that a N-point FHT will typically be required to demodulate N-channels for each received symbol period in the receiver (which corresponds to the required dechannelizing and despreading operation for each potential data channel and symbol). Also note that other embodiments of the transponder system may utilize orthogonal Walsh codes for channelizing functions, in which case the FHT bins would correspond directly to the Walsh code channel indexes (and no re-ordering process is necessary). Such a system would not have as good of interference rejection capabilities when compared to the preferred embodiment though, since Walsh channelizing codes are periodic and could be highly correlated with periodic interference sources. Therefore, the preferred embodiment of the system utilizes specially augmented m-sequences as channelizing functions, and the above described demodulation techniques. Also note that it is not strictly necessary to utilize the described fast correlation techniques in the described system (i.e., brute force or traditional correlation/despreading techniques may be utilized), though the implementation cost (e.g., circuit area and current drain) will be higher in such implementations.

As an example, for a system that utilizes length 16 (N=16, n=4) specially augmented PN sequences in the tag transmitters, the sequence 1260 represented by the channel selection value 1130 ($n_i$) of '0001' (1) in binary will be '0111101011001000', while the sequence 1260 represented by the channel selection (mask) 1130 value of '1001' (9) in binary will be '0010110010001111' (which is just a different time shift or code phase of the same basic m-sequence that is subsequently specially augmented with a leading zero). An example of the tag PN generation and mask circuitry for a primitive polynomial of 23 (when expressed in standard octal notation) is shown in FIG. 11. Two tag transmitters are assumed to send these sequences independently over the communications channel. The reader receiver will resolve these two signals using a special re-ordering function 1520 and FHT processing (as shown in FIG. 15). The special received data sample re-ordering that must be utilized for the transmitted PN sequences is the same as the states that an equivalent specially augmented PN generator would cycle through, or {0, 15, 7, 11, 5, 10, 13, 6, 3, 9, 4, 2, 1, 8, 12, 14, the same as is shown in 1120} for this example. This sequence may be generated in the reader 100 by replicating the m-sequence generator 1110 that is utilized in the tag 110, and observing the PN generator states, or by simply storing the required re-ordering sequence in memory. The re-ordering sequence is utilized to store the incoming received data sample stream into memory using indirect addressing. For example, the first valid A/D sample (optimally sampled at the spreading or chip rate) that arrives at the reader is stored in memory buffer location 0 of storage medium 1530 (as is the case for all specially augmented codes), the second sample is stored at memory location 15, the third at location 7, and so on. Once N (16 in this example) samples are received, normal FHT processing 1540 can be performed on the newly re-ordered data samples in the memory buffer 1530. The re-ordering function will translate the '0001' PN code above into the sequence '0101010101010101' (which is identical to Walsh code 1) and the '1001' PN code into the sequence '0101010110101010' (which is identical to Walsh code 9). The FHT 1540 will indicate that signal energy is present (e.g., tags are transmitting) in bin 1 (corresponding to channel code 1) and bin 9 (corresponding to channel code 9) of output 1550. Thus, by observing the bin 1 and bin 9 FHT outputs for each transmitted symbol, the remainder of the tag data can be sensed.

Note that the techniques described above may be utilized for traditional (i.e., non-specially augmented) m-sequences by assuming in the receiver that the first chip (or symbol) that is sent by the tag 110 is a binary zero (which is equivalent to a +1 normalized signal value on the channel), even though no such signal was actually sent. Thus, the first buffer location in the storage medium 1530 is initialized to a +1 value, and processing (i.e., re-ordering 1510 and FHTs 1540) continues as normal. In this manner, very fast correlation can be performed for multiple code channels (or code phases) for traditional PN sequences. Other normally augmented PN sequences can also be accommodated by keeping track of where the additional chip (e.g., other than the first chip as described above) is inserted into the sequence.

The above described fast correlation techniques (i.e., a particular receive sequence re-ordering 1510 and FHT 1540) apply to any communication system that uses PN sequences that can be generated with an AND-XOR reduction network 1100 (whether or not they are generated with such a network). Many popular communications systems utilize these types of PN sequences, or sequences generated from a combination of traditional m-sequences (such as Gold codes, as is well known in the art). Some examples of such systems are the IS-95, IS-2000, 3GPP CDMA cellular systems, and the GPS CDMA location system. The above fast correlation techniques can be equally as effective in these systems.

Figure 16:
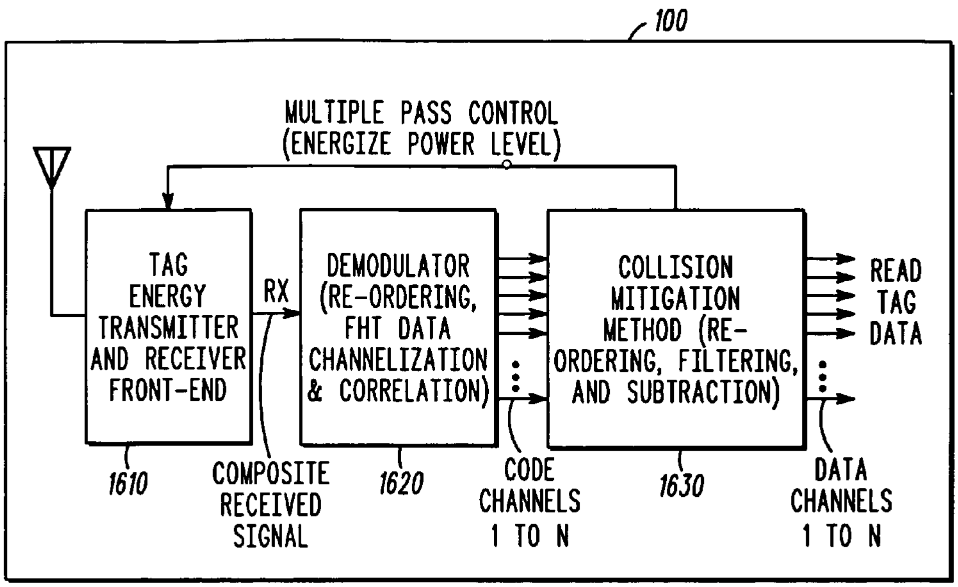
FIG. 16 illustrates a simplified functional block diagram of the reader signal processing in accordance with the present invention.

In any case (regardless of the channelization techniques employed), the composite received signal must be filtered and amplified in the receiver front end 1610, and then channelized (or de-channelized) 1620 in the reader 100 as illustrated on FIG. 16. Each channel is then generally processed separately (though possibly concurrently) for signal and collision detection purposes (generally in 1630). For example, in another embodiment of the system that uses Walsh codes in place of the described m-sequences, an FHT operation could still be utilized to simultaneously demodulate all of the different data channels as described above. Other embodiments of the system may utilize a bank of (parallel or time-shared) traditional despreaders (in place of 1540, 1620) to perform the dechannelization and despreading process. A despreader typically consists of a multiplier followed by an integrate and dump function, as is well known in the art.

In another example of the communication system, other embodiments may utilize orthogonal timeslots as the channel (such as in a slotted ALOHA system), in which case signals from different tags would be demodulated as they arrive (at different points in time). It should be noted that the selected channelization method does not change the general type of collision mitigation algorithms that can be employed in the reader 100, as further described below.

Also note that the demodulation process is generally a multiple iteration process in many embodiments of the present invention, since it is typically not likely that all tags will successfully transmit their information on the first pass of the multiple pass transmission algorithm. Thus, the reader 100 must remain powered up (at the same power level) and continually demodulate the incoming data until all data from the tags has been successfully received (further using the methods described below). Also, when advanced collision mitigation techniques 1630 are utilized in the reader 100 (as detailed below), multiple demodulation iterations (e.g., FHTs) may be required for each pass of the multiple pass algorithm. Also note that subsequent passes of the multiple pass transmission algorithm may require the demodulator to adapt to a new number of channels, as described in the dynamic channel profile discussion above.

V. Collision Mitigation Methods

As mentioned above, there are a limited number of communications channel resources in this (and any) communications system for which the tags 110, 120, 130 can utilize to communicate to the reader 100. Since there are a limited number of communications channels, and no organized assignment of channels among multiple tags (i.e., random assignments are effectively utilized), there will inevitably be collisions of transmissions from the tags in the described system. A collision is defined as the case or event when two or more tags choose to communicate on the same channel at the same time (i.e., during a particular pass of the multiple pass transmission algorithm). It should be recalled that the assignments are effectively random because the data stored on the tags closely approximates uniform random data, as indicated in Section I of this document.

It is possible to either utilize or not utilize collision mitigation techniques in the reader 100 in the described system (as further detailed below), depending on the desired complexity of the reader 100. For instance, a low cost receiver may not utilize any collision mitigation techniques, while a higher cost (higher processing power version) of the receiver may utilize advanced collision mitigation techniques.

The general discussion below first assumes that no particular collision mitigation techniques are utilized, and then later examines cases where collision mitigation techniques are utilized. Note that the tags 110, 120, 130 in general transmit the same patterns regardless of whether collision mitigation is utilized in the reader 100. Each tag (e.g., 110) is in effect 'blind' to other tags present in the system (e.g., 120, 130). Performing the following additional steps further carries out the demodulation process in the receiver.

In general, the reader 100 cycles through each of the possible despread communications channels (either sequentially or concurrently) in a given communications pass, and looks for signal activity or signal energy on each. The reader receiver in the described invention should also be able to detect collisions on each of the available channels, as fully described below. All of these signal characterizations occur per channel, and are generally performed once despreading is completed in order to reduce implementation complexity (though it is also possible to perform equivalent operations before despreading without loss of generality). Note that the received signal is synchronously sampled (at the optimal sampling point) in the preferred embodiment of the system, though other methods (involving oversampling and the post-sampling determination of optimal sampling time are possible).

The preferred embodiment of the receiver utilizes a reduced complexity method of estimating the signal energy on each channel. In particular, this method examines the cumulative (summed) absolute value of each channel's optimally sampled despreader output signal in the described invention. If the accumulated absolute value for a given channel exceeds a predetermined threshold, a signal is said to be present on that particular channel. The predetermined threshold may be made programmable or adaptive (based on other conditions in the reader receiver). This method has the advantage over traditional energy estimation (sum of squares) means in that it does not require costly multiplication operations to determine the presence of signals.

Specifically, in one particular embodiment of the system, the presence of a low deviation ASK signal(s) from a tag is typically detected by subtracting out any mean signal level (i.e., de value as in 1380) from a channel to obtain a normalized signal, and examining the absolute value of the remaining (normalized) signal, as described above. Note that a form of automatic gain control (also in 1380) may also be applied to further normalize the signal levels.

Once a signal is detected on a particular channel, the reader 100 must typically detect if a collision has occurred on that channel. This may typically be achieved by examining the variance of the absolute value of the normalized signal level over some time period. If the variance of the absolute value of the signal exceeds some (different) threshold, a collision is said to have occurred on that particular channel (due to conflicting binary data values of different tag's ID data—see FIG. 17); otherwise, a single signal is said to be present on that channel (as in FIG. 18). A channel with a single signal present on it is also termed a "single occupied" channel. Once again, those skilled in the art recognize that filtering or averaging of these measurements and indicators may be utilized to increase their reliability (e.g., to increase the SNR of the estimates). Thus, the longer the time period that is observed for such measurements (and utilized in the subsequent filtering), the more accurate and more reliable the estimates will become (i.e., the higher the processing gain).

As mentioned, the reader receiver can sense collisions on each channel by examining the variance of the normalized signal on each channel. The variance of the normalized signal can be thought of as an error signal, and represents deviation from an ideal signal. Once again in the preferred embodiment, a reduced complexity means for determining signal collisions is performed. In particular, the absolute value of a normalized (possibly dc-corrected) error signal is accumulated for each channel. If the cumulative absolute error signal exceeds a second predetermined (though possibly adaptively determined) threshold, a collision is said to have occurred on that channel. The normalized error signal can be partially determined from results of the reduced complexity signal presence calculation described above. Specifically, the normalized error signal can be set equal to the absolute value of the optimally sampled despreader output minus the absolute average signal level (determined by scaling the cumulative absolute value computation above). This value can be summed over all despreader output bits to provide additional noise averaging (in order to increase the SNR of the estimate). This method also has the advantage over traditional variance estimation (sum of square of sample minus average value) means in that it does not require costly multiplication operations to determine the presence of signal collisions.

Those skilled in the art recognize that there are many methods available to detect the presence of a signal, and to detect the presence or absence of collisions, which may vary based on the modulation and signaling type. Collisions may be detected by alternate means, such as standard error detection (e.g., CRC) means, though these methods may not in all cases properly detect collisions (due to falsing). Also note that whether or not collisions occur on a channel, standard error correction means can be employed to correct for transmission errors and improve the accuracy of the signal estimates. Once again, these signal characterization measurements are typically performed on all of the available (possible) communications channels in a given pass (which may vary with the pass number of the multiple pass algorithm, as described above).

Thus, the reader 100 typically characterizes whether any signal is present on (each and) all of the possible communications channels per pass, and whether a collision has occurred on each channel where signal(s) are present. Recall that a collision is generally defined as when two or more tags utilize the same communications channel during the same pass of the multiple pass algorithm. When a collision occurs on a given channel, the data for that channel is generally lost if no collision mitigation techniques are utilized. If a signal is present on a given channel, and no collisions are detected, the particular signal on that (given) channel is typically said to be successfully received, and the reader 100 generally knows the entire data sequence of that particular tag.

Note that some embodiments may perform error detection or correction (or some other type of signal integrity measure) to ensure that the data is valid and received correctly. Also note that if the tag channel selection data is transmitted, the reader 100 may also check that the tag 10 has indeed communicated on the expected communications channel (serving as another form of error checking for the portion of the data that is used to determine the channel as described above—also see FIG. 18, where the channel selection data 222 for the second pass must match up with the channel choice, as identified with 1820, 1830, 1840).

Once the signal from the tag 10 is known (and possibly confirmed), it may be ignored, or removed (as described below) from the rest of the signal population. A form of collision mitigation is implemented if a signal from a particular tag is effectively removed or subtracted from the signal population (through a variety of possible algorithms described below). In this manner, the signal from a known (identified) tag can be removed, thus removing unwanted "interference" from the system. This effectively frees up valuable communications resources. In effect, the entire system is a self-organizing network, where all of the organization is done in the reader receiver instead of the transmitters themselves. Note that the removal of the signal does not have to be exact to realize a benefit from collision mitigation.

Figure 19:
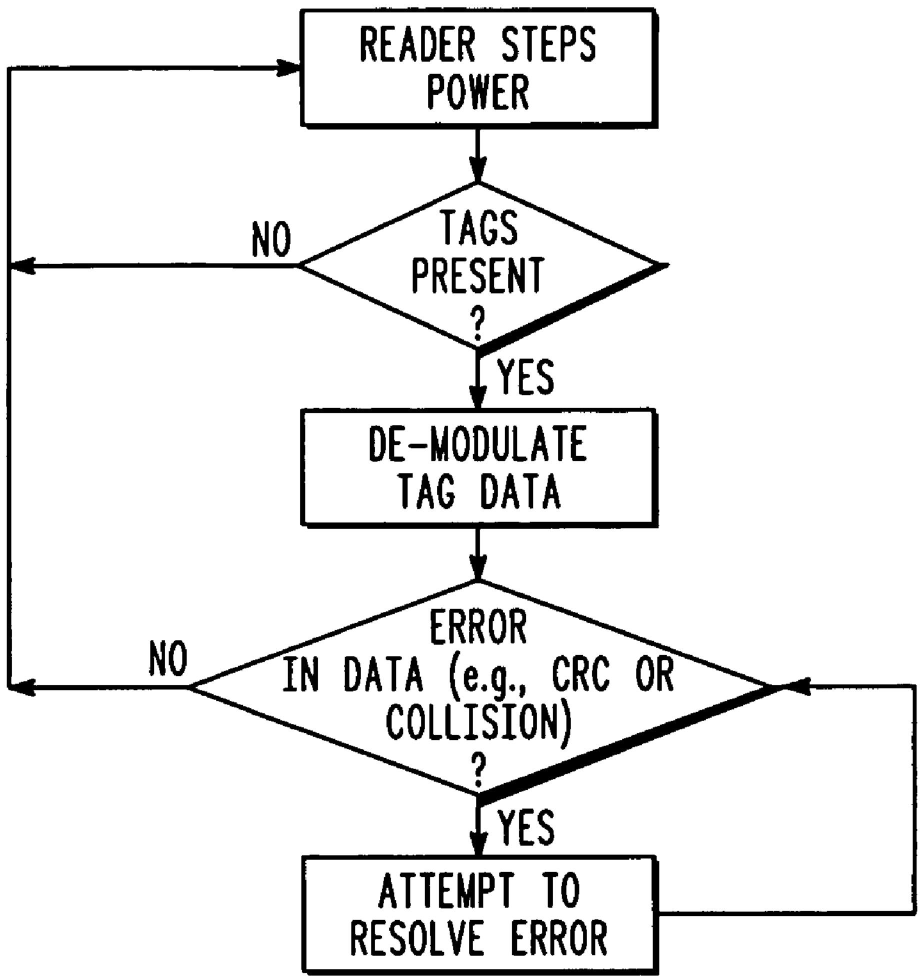
FIG. 19 illustrates a general flowchart for the reader actions in accordance with the present invention.

FIG. 19 shows a general flow chart for reader actions when utilizing collision mitigation techniques. In this case, the reader 100 will attempt to resolve as many collisions (e.g., errors in data) as possible before moving on to the next pass of the multiple pass transmission algorithm (e.g., by holding the reader transmit power constant in the preferred embodiment).

As described above, the reader 100 will generally keep transmitting at a given power level until some confidence level (or probability) is obtained that all actively transmitting tags have been identified.

If the signal is not actively removed (or subtracted) from the signal population (or composite received signal), then no collision mitigation is said to have occurred. In that case, it is possible to use a variety of algorithms in the reader 100 to successfully acquire (or demodulate) all of the data from the tags. The general idea in this case is to wait for each tag to choose a unique (that is, single user occupied) communications channel in at least one of the passes of the multiple pass source device transmission algorithm. This technique is generally the lowest complexity identification method available in the reader 100, though it is also generally the slowest (i.e., requires the longest total transmission time to communicate a piece of information).

One very low complexity algorithm for the case of when no collision mitigation techniques are utilized by the reader 100 is to simply have the tags 110, 120, 130 transmit the maximum number of passes in the multiple pass communications algorithm. The maximum number of passes is typically determined (as described above) when the unique portions of the data stored on the tag is exhausted.

As noted above, the reader 100 directly controls the number of passes that the tags transmit on by controlling the first and second predetermined transmission conditions. In the preferred embodiment of the present invention, the reader transmit power level is held constant in order to continue transmissions among fully activated tags, though other first and second predetermined transmission conditions are possible to control the groups of transmissions from the tags. The maximum number of passes is generally determined by the particular channel selection algorithm, but is partially limited to the data length (in bits) divided by the sum of the channel selection portions of data (in bits) for completely unique (non-overlapping) channel selection choices. Thus, in the example given above with 128-bits of data, and 8-bits of channel ID selection data in each pass, there is a maximum of 16 (i.e., 128/8) communications passes in the multiple pass algorithm (before non-overlapping channel choices start to repeat again). Thus, given a channel (e.g., PN) symbol rate in the preferred embodiment, the maximum interrogation time can be determined, and the total acquisition (or reading) time is fixed for all cases given a required number of transmission passes (as also illustrated in the equations above).

Other (in many cases more complicated) algorithms that use no collision mitigation techniques are also possible. One such alternative is to have the tags 110, 120, 130 transmit for a limited number of passes (less than the maximum), such that a given confidence level is obtained that the received data (or taken tag inventory) is correct. This is generally determined by the expected number of source devices (or tags) present in the system (or at each power-on level), and the desired confidence level (or probability of successfully identifying the items or tags in the system). For instance, with the dynamic channel profile given in the example above, simulations (over 1000 trials) have shown that it takes an average of 7.73 transmission passes to identify 50 tags, though a maximum of 10 passes was required to uniquely identify tags in 1000 trials. Thus, the reader 100 could remain powered up at a given power level for 10 passes to have a reasonable confidence that all of the 50 (or so) tags have successfully transmitted their data on a unique channel. Once again, the reader 100 would only have to be able to determine when there is only one tag 110 on a channel to receive its ID data. This would result in a substantial total acquisition timesavings, since only 10 passes were performed instead of the absolute maximum of 16 passes given in the example above. Further simulations, statistical or probability analysis could be applied to determine other confidence levels or the number of passes for a given number of tags. Note that in some applications, the reader 100 could utilize the maximum number of passes the first time it takes an inventory, and then adjust the number of passes based on the expected (i.e., measured or observed) number of tags present in the system.

Figure 22:
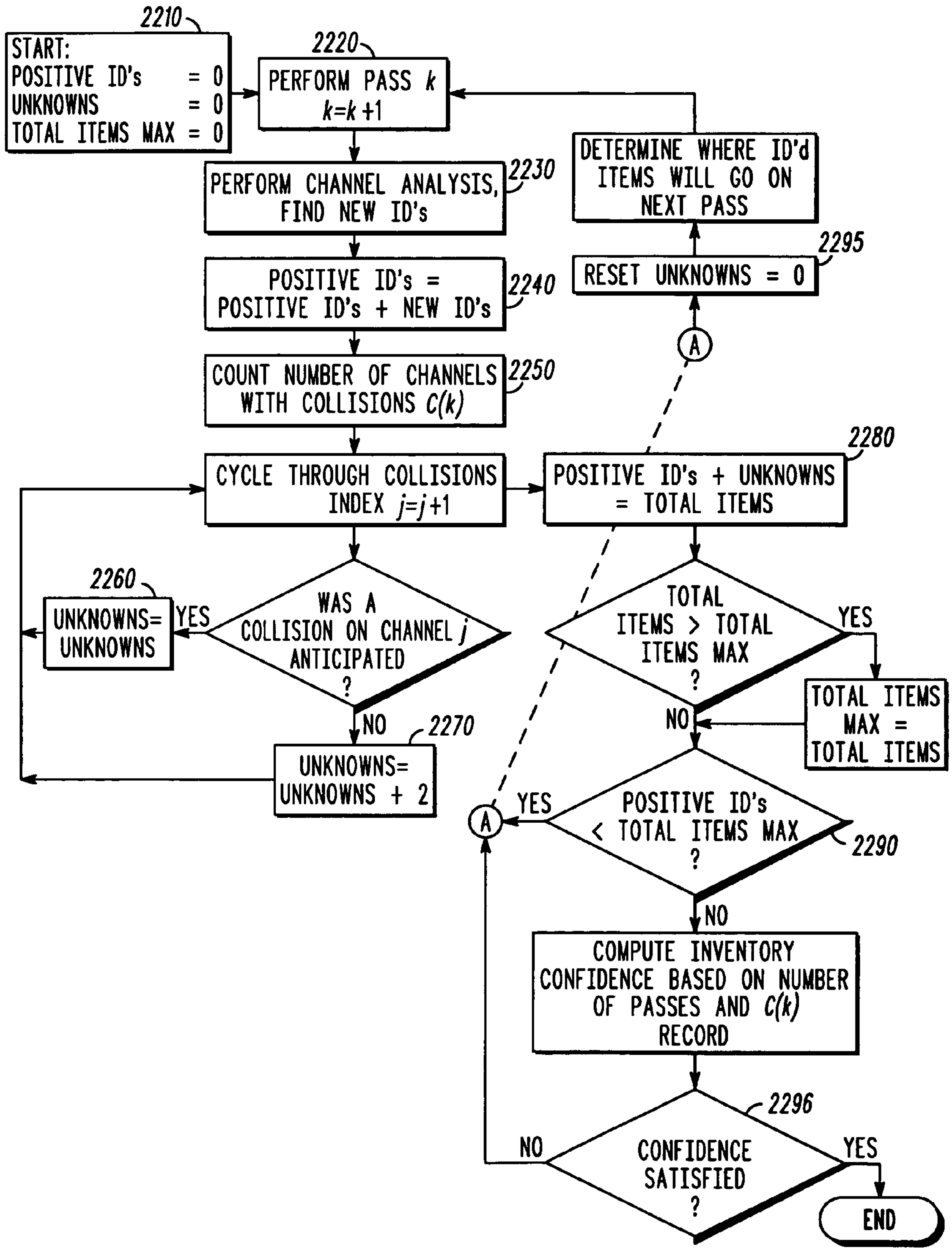
FIG. 22 illustrates an example flowchart of the inventory algorithm when no collision mitigation techniques are applied in accordance with the present invention.

Alternatively, the algorithm used by the reader 100 could keep track of expected collision locations (i.e., channels) for each tag (once its data or ID information has been successfully received), and estimate how many tags are left to be identified in the system. Thus, the reader 100 may be able to stop the interrogation process sooner than the techniques described above (once it determines that no other tags are likely present in the system). In other words, the required number of transmission passes is adaptively estimated by the reader 100 during reception, instead of being pre-computed based on the expected number of tags as described above. This technique is further described in the examples below, and in FIG. 22.

A more advanced embodiment of the reader 100 may utilize any one of several forms of collision mitigation techniques. Collision mitigation techniques generally lessen the impact of collisions on a given communications channel. Ideally, they remove the effects of a particular collision on a channel. This can be accomplished in the described system by (at least conceptually) regenerating a known signal and subtracting the known signal from the total signal population (or composite received signal). Known signals can be considered as interference to other (unknown) signals, thus the described techniques are also known as interference cancellation techniques. Note that this interfering signal subtraction may occur at any stage in the demodulation process (e.g., it may occur at the chip-rate or it may occur after despreading in the preferred embodiment). The preferred embodiment of the present invention performs collision mitigation after despreading in order to reduce the implementation complexity.

Generally speaking, a family of collision mitigation techniques exists of varying levels of complexity, and they are generally more complex (e.g., require more processing power, memory or hardware) than implementations that do not utilize collision mitigation techniques. However, such techniques generally result in much shorter total tag data acquisition (reading) times, and can greatly increase system capacity. Once again, it is assumed that the channel is quasi-static, and the system is relatively linear for best system performance.

In general, the more signals that are known (i.e., successfully determined), the fewer tags appear to be present in the system for a given pass of the multiple pass algorithm, when utilizing collision mitigation techniques. Since the data stored on the tag 10 directly determines the channel selection in the preferred embodiment (or it is otherwise known by the reader 100), once the reader 100 has successfully received the data (generally occurring when the tag 110 transmits on an otherwise unoccupied channel), it knows all of the channel choices that the tag 110 will make for every pass of the multiple pass communications algorithm. Thus, the reader 100 can then predict what channels the tag 110 will utilize for future (and past) transmissions, as above. Note that the observed signal levels from the tag 110 are also generally measured (and low pass filtered) in the reader 100 during the normal signal detection process so a reliable estimate of a given (non-colliding) tag's actual signal strength is available. This knowledge can be utilized to effectively re-create the known signal and accurately subtract it out from the aggregate received signal, thereby removing its effect from other transmission passes.

Specifically, the average signal level (and possibly phase) for each successfully received tag signal can be determined by averaging over some portion of one or more transmission passes. Recall that a tag is successfully received when it transmits on a single occupied channel, in which case its data can be successfully demodulated by traditional means. Once again, in order to simplify processing in the preferred embodiment of the system, the average cumulative absolute value is computed (as in the signal detection stage described above). The average value of the (possibly dc-corrected) absolute signal level on each channel (after despreading) represents the expected signal level for that tag (i.e., a received signal strength). For receivers employing complex data paths (such as those in RF-coupled systems), signal phase may also be averaged over some portion of the transmission pass.

If the channel is quasi-static, or stable over the period of interest (as it often is for short read cycles), the interfering tag's signal level can be assumed to be stable; thus, a locally regenerated form of it can be removed or subtracted from the composite received signal. Since the signal from a successfully received tag is no longer needed or useful (once it data has been determined), removing it frees up communications channels for other unknown tags to communicate on. A known tag's data signal can be recreated by multiplying it's demodulated data symbol or bit sequence with the average expected signal level. The subtraction of this signal can occur after despreading; otherwise, the particular spreading sequence would have to be reapplied if it were to be subtracted before despreading (which is not at all desirable from a computational complexity standpoint). Note that the tag's signal will be known to change channels in each pass of the multiple pass transmission algorithm, which can also be taken into account in the subtraction process. Also note that the number of available channels and spreading codes may change for each pass of the multiple pass algorithm.

Figure 20:
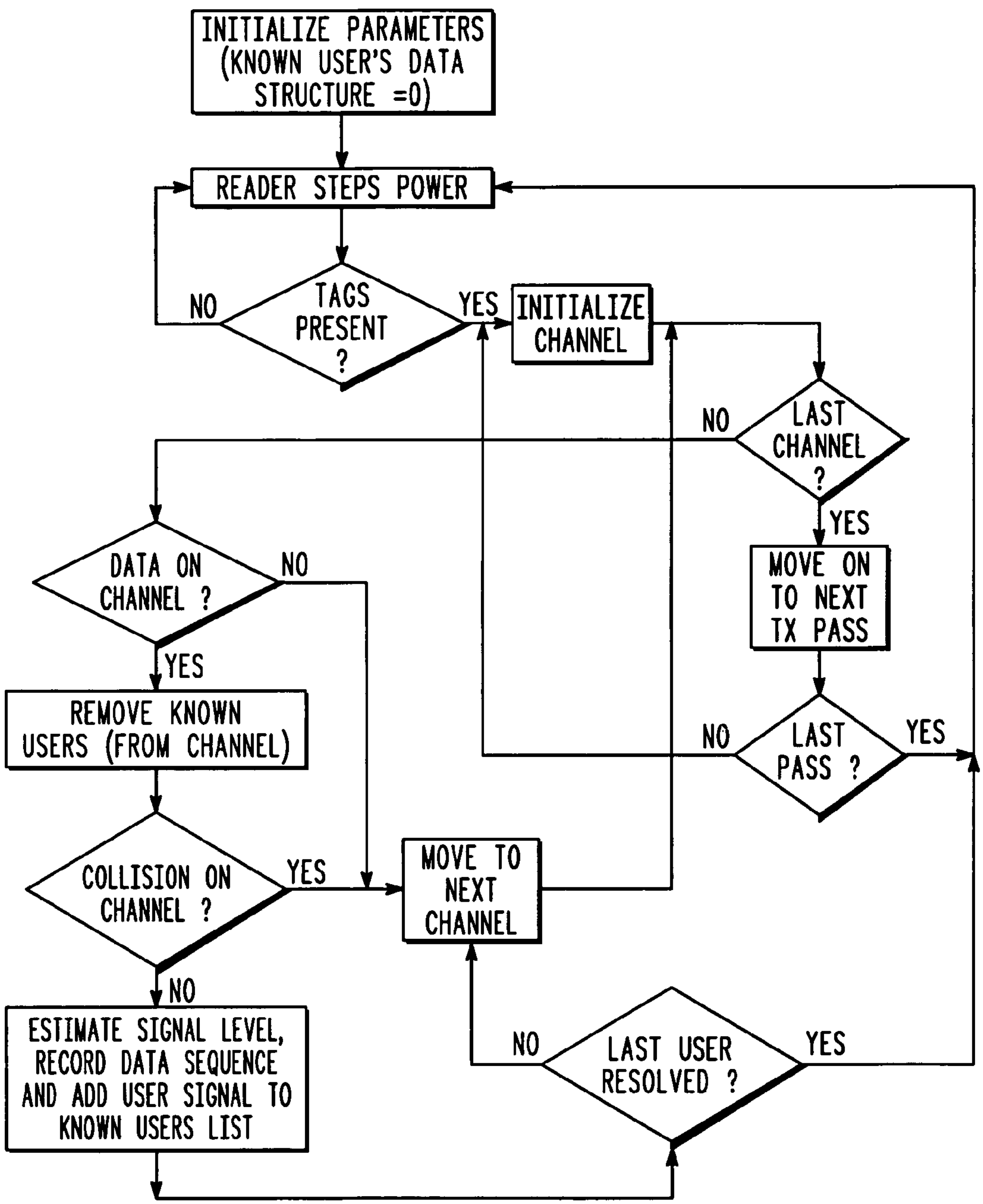
FIG. 20 illustrates a detailed flowchart of a reader processing signals using forward collision mitigation techniques in accordance with the present invention.

A relatively simple form of collision mitigation involves subtracting known signals from subsequent passes of the multiple pass algorithm (in a forward direction with respect to time). Thus, this form of collision mitigation is generally termed forward collision mitigation. FIG. 20 shows an example flow chart for reader processing using forward collision mitigation techniques, where the processing is performed in a sequential (e.g., one channel at a time) fashion in order to ease understanding of the process. The process generally involves determining which tags 110, 120, 130 have successfully transmitted their ID data (as described in the receiver algorithms above), and keeping a data structure (or list) containing known (tags') channel choices and estimated signal levels for each pass of the multiple pass algorithm. Once a tag's ID data and the signal level of a transmitted tag signal are known, it can effectively be removed from any subsequent collisions involving that tag. Note once again, that the signal level can be measured and filtered over increasing lengths of time to obtain increasing levels of accuracy of the interfering signal level. Thus, in one embodiment of the present invention, once a tag signal is estimated (determined within some level of accuracy), it is subtracted out from the proper (pre-determined) channels in later passes of the multiple pass transmission algorithm, negating any interfering effects of that (known) tag's signal on other signals transmitted by other users. This technique is made possible due to the deterministic nature of each tag's channel choices, which are typically based on the data stored on the tag 110.

The quasi-static channel assumption becomes important here since the measured signal level and possibly phase will generally be assumed to hold for all subsequent passes, or at least the current pass of the transmission. In general, the signal level estimates could be updated every transmission pass to account for slowly varying channel conditions. Note that only the known tag signal information (typically contained in a data structure or list) and the composite received signal from the current transmission pass (or burst) needs to be stored to perform this algorithm (as opposed to storing all received bursts in memory as described in the algorithm below). In general, this type of forward collision mitigation algorithm can result in a significant (2–4×) total reading time improvement over methods that do not perform any collision mitigation.

Another more advanced form of collision mitigation involves subtracting known signals from both subsequent and previous passes of the multiple pass transmissions. This is possible because, once the data from a tag 110 is identified, the channels it occupied on previous passes can be ascertained and its contribution to any previous collisions can be nullified. This class of collision mitigation algorithms is generally termed as bi-directional collision mitigation techniques. Bi-directional collision mitigation is more computationally complex (and generally requires more memory to store prior communication passes), but results in greatly reduced total tag reading time (reduced by roughly an order of magnitude over methods that do not perform any collision mitigation).

Generally, this method requires storing a data structure containing known channel choices and estimated signal levels in each communications pass (as in the case above) for identified tags. However, since signals are subtracted out from prior transmission passes (in addition to the current pass as in forward collision mitigation algorithms), additional collisions can be resolved. For example, if data from the third pass of the multiple pass communications algorithm is resolved (i.e., successfully received), it may result in the data from another user being resolvable in a prior pass (e.g., the second pass) of the algorithm, which in turn may free up another user that was previously colliding in either a prior (e.g., the first pass) or subsequent pass (e.g., the third pass) of transmissions. Every time data from a new user is resolved, its reconstructed signal is subtracted from all transmission passes (up to and including the current pass), and the number of channels that are single occupied and those in collisions are evaluated again (for all possible communications channels and passes). In this manner, the reader 100 may cycle through all of the available transmission passes (up to and including the current pass), and resolve more tag signals virtually continuously, until a point is reached where no more users can be resolved in any of the passes (up to and including the current pass). The reader 100 would then step to the next power level and continue with the bi-directional collision mitigation algorithm. The effect can be quite powerful in later transmission passes, allowing a number of tag signals to be resolved which is much greater than the available number of communications channels.

Note that since the spreading gain can change dynamically (per pass), as directed by the reader, it may be necessary to re-normalize signals for a particular spreading factor before subtracting them out from the composite received signal. Also note that the recursive passes of bi-directional interference cancellation may be performed in any order (in time).

Once all of the tag data has been received, the reader 100 may check the integrity of the data via the means mentioned above (e.g., error detection and correction), preferably before any signal cancellation occurs. Traditional data demodulation techniques may be performed based on the type of modulation that is utilized in the tag transmitters. The reader 100 may also post-process the data, which typically includes functions such as descrambling, de-encryption, classification, and removal of redundant items (which power up in more than one power-on range in the preferred embodiment of the present invention). Note that some or all of these functions could take place at a centralized location, thereby serving multiple readers or antennas.

Once a complete read cycle using collision mitigation techniques is finished (i.e., all active tags are identified), the interference characteristics for each signal in the system is known. In particular, the signal amplitude and phase is known (or estimated) for each pass of the multiple pass transmission algorithm, and the data sequence for each active tag present in the system is known. In effect, all information is known about each tag's signal. The complete read cycle is known to take L' transmission passes, which can be associated with a total transaction (read) time, depending on the signaling rate and data payload size, as described in the equations above.

EXAMPLES OF SYSTEM OPERATION

Figure 23:
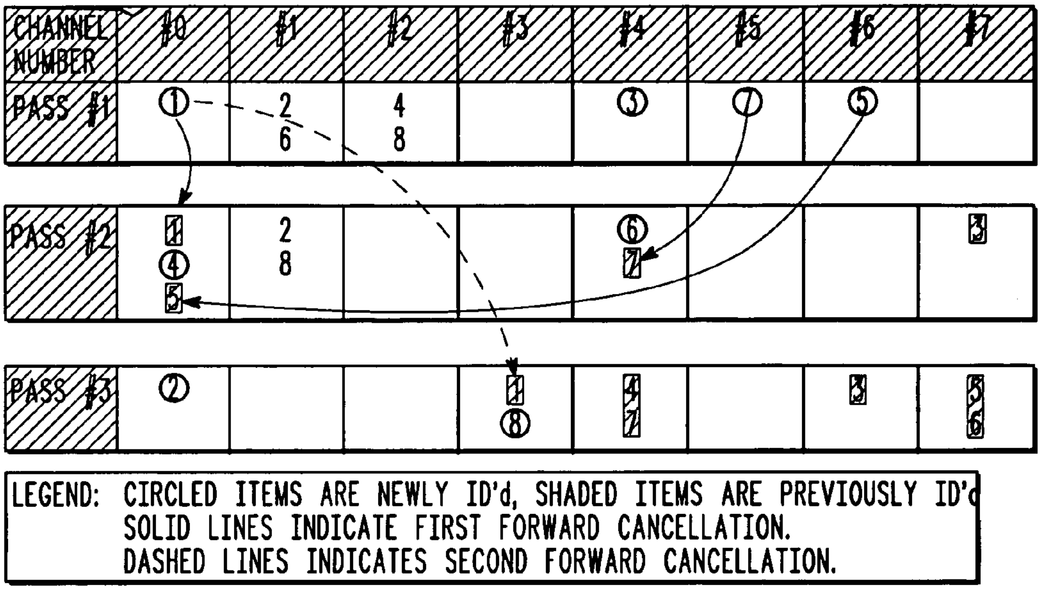
FIG. 23 illustrates an example inventory accounting with forward collision mitigation techniques in accordance with the present invention.
Figure 24:
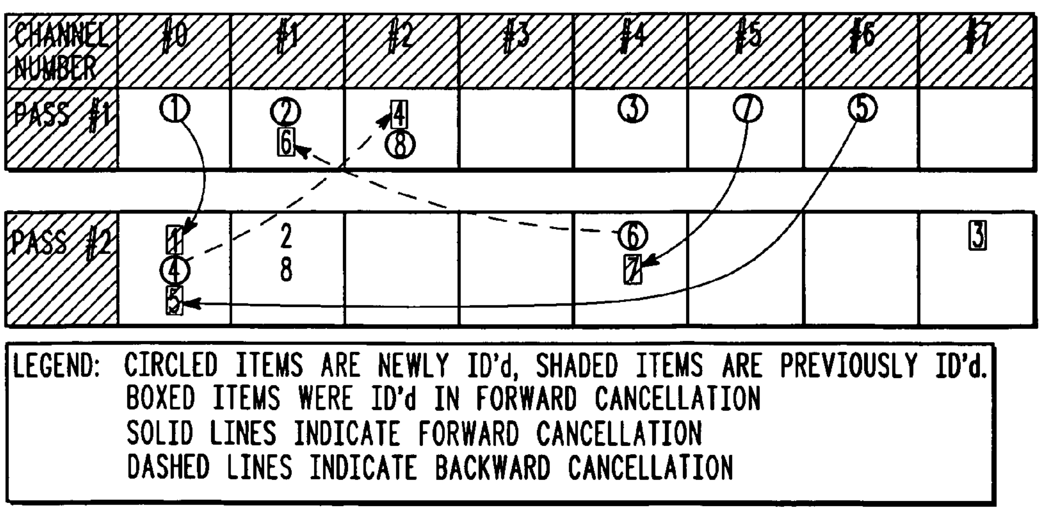
FIG. 24 illustrates an example inventory accounting with bi-directional collision mitigation techniques in accordance with the present invention.

The operation of these algorithms is perhaps best conveyed by way of examples. The examples will detail a simplified, hypothetical system of tags that draw random channels each pass. FIGS. 21, 23, and 24, which will be used to explain the example, are a state diagram of the system, showing which channel each tag picks to communicate over on each subsequent pass through the transmission algorithm. The states in the example are unaltered outputs of an actual experiment using a random number generator to choose the channels. The type of physical channel (e.g., code phase, etc.) is irrelevant at this point. This should provide an accurate model of the overall system due to the data scrambling portion of the present invention as detailed in Section I above.

The example detailed in FIGS. 21, 23 and 24 assumes a population of eight tags, and further assumes a fixed channel size per pass of eight channels from which the tags may draw from to communicate. Thus, three-bits of (e.g., possibly a unique subset of) each tag's ID information is used to select one of eight channels that each tag 110 will transmit on during each pass of transmission in the preferred embodiment. With octal digits, the first thirty bits of the tags ID's were randomly generated and are repeated below for convenience:

| | |
|---|---|
| Tag 1: | 0033 0436 07 . . . |
| Tag 2: | 1106 2551 65 . . . |
| Tag 3: | 4767 4416 41 . . . |
| Tag 4: | 2044 6111 36 . . . |
| Tag 5: | 6072 3355 74 . . . |
| Tag 6: | 1476 5432 40 . . . |
| Tag 7: | 5443 3675 34 . . . |
| Tag 8: | 2135 5115 64 . . . |

Tag 1 will choose channel 0 during Pass #1, channel 0 during Pass #2, channel 3 during Pass #3, and so on. Tag 2 will choose channel 1 during Pass #1, channel 1 during Pass #2, channel 0 during Pass #3, and so on. From this list, it can be seen that, for Pass #1, which draws a channel from the first octal digit, tag 1 is the sole occupant of channel 0, tag 3 is the sole occupant of channel 4, tag 5 is the sole occupant of channel 6, and tag 7 is the sole occupant of channel 5. Since there are no collisions in these channels, tags 1, 3, 5, and 7 are successfully identified in their entirety; tags 1, 3, 5 and 7 communicated their full ID in a channel that had no collisions. On Pass #1, however, tags 2 and 6 collided in channel 1, and tags 4 and 8 collided in channel 2. These tags cannot be successfully identified, and will require subsequent passes to be resolved. The reader 100, observing that collisions exist, leaves the power applied at the present level and allows all of the tags to draw another channel from the second octal digit for Pass #2. It should be noted that none of the tags know whether they have successfully communicated their ID information at any stage of the transmission process. Only the reader possesses this knowledge; it will signal the tags when the entire reading process is done by removing the transmission conditions (e.g., powering down).

In Pass #2, the only tag not involved in a collision is tag 3. Since this tag was already identified in Pass #1, the reader 100 did not acquire any new information. None of the tags that were in collisions in Pass #1 can yet be identified. Statistically, for eight tags and eight channels, there is a $1-8!/8^8=99.76\%$ probability that there will be at least one collision. This result comes from the more general case of the probability of no collision between M tags over N channels given above:

$$P\{\text{no collision}\} = \frac{N!}{(N-M)!}\frac{1}{N^M}$$

and the fact that P{collision}=1−P{no collision}. There will be this same probability of at least one collision for each pass through the algorithm. For this combination of tags and channels, averaged over 100,000 experiments, 2.7498 of the eight channels are unoccupied per pass, 3.1386 of the channels contain a single tag, 1.5737 channels contain two tags, 0.4482 channels contain 3 tags, 0.0796 channels contain 4 tags, 0.0093 channels contain 5 tags, $7.2\times10^{-4}$ channels contain 6 tags, $4\times10^{-5}$ channels contain 7 tags, and no cases of eight tags in one channel were recorded.

No Collision Mitigation Example

With no collision mitigation, tags have to show up in a channel all by themselves in order to be identified. If the experiment is allowed to run enough times, this will happen. However, with only a limited number of bits in the tag ID 220 information, the experiment may only be run a limited number of times before it starts repeating. For example, if the tag ID was 96-bits long, and three bits per pass were used to draw a channel (one of 8), then after 32 experiments the process would repeat. Since there is a high probability of at least one collision per pass (99.76% for this scenario), there is a small but finite probability that a tag's ID can 'hide' in collisions on each and every pass through the experiment. This does not mean that a tag's ID 220 is identical to a different tag's ID over the entirety (which is not allowed by the assumption of unique tag ID's and a unique, reversible mapping to a scrambled tag ID). All that it means is that the tag's ID 220 is identical to at least one other tag's ID when examined over the small number of bits (in this case, three) being used to define the channel space for that pass. This introduces the concept of inventory or item uncertainty, where an inventory of tags is known only to a certain confidence.

For the example experiment in FIG. 21, eight trials are required for each tag to make an appearance in a collision-free channel. As already mentioned, tags 1, 3, 5 and 7 are identified in Pass #1, tag 2 shows up in Pass #3, tags 4 and 8 are identified in Pass #4, and tag 6 does not show up until Pass #8. Tag 6 is a good example of how a unique tag can be hidden in collisions even though it has a unique ID. If this experiment had only been run through Pass #7 (i.e., if the IDs were only 21 bits long), tag 6 would not have been identified.

In Pass #1, four tags are identified. Two collisions are also identified, indicating that there are at least four other tags (since it takes at least two tags to result in a single collision, it takes at least 4 tags to result in two collisions). So after the first pass, the reader 100 can determine that there are four known tags and at least four unknown tags, or at least eight tags in total.

In Pass #2, only a single, previously known tag is occupying a unique (unused) channel. Since the reader 100 knows the complete ID for tags 1, 3, 5 and 7, it knows what channels these items will be occupying in the next and all subsequent passes. The reader 100 knows that tags 1 and 5 will go to channel 0, and that tag 7 will go to channel 4. The reader 100 thus expects there to be a collision on channel 0, but there is a possibility that there is also an unknown tag that is occupying channel 0 (in this case, tag 4). Channel 0 indicates two known tags and a potential for one or more unknown tags. The reader 100 was not expecting a collision on channel 1 (since none of the known tags were expected to choose that channel). A collision here indicates at least two more unknown tags, with perhaps more. A collision on channel 4, where only tag 7 was expected, indicates at least one other unknown tag. Thus, Pass #2 results in four previously known tags, with at least three (definitely) unknown tags. This is less than the set defined by the first pass, which was four known tags and at least four unknown tags, so the reader 100 gathered no new information in the second pass.

In Pass #3, tag 2 is identified on channel 0. Tag 1 was the only tag expected to go to channel 3, so a collision there indicates at least one unknown tag. Tag 7 was the only item expected to go to channel 4, so a collision there indicates at least two unknown tags (the unknown tag on channel 3 and the unknown tag on channel 4). Tag 3 is again by itself. Tag 5 was the only tag expected to go to channel 7. A collision there indicates at least three unknown tags (counting the unknown tags on channels 3, 4 and 7). These, along with the now five known tags, again indicate at least eight tags.

Pass #4 identifies new tags 4 and 8. Tags 3, 5 and 7 turn up in collision-free channels. Tags 1 and 2 were expected to collide on channel 6, but there may be additional tags there. This leaves seven known tags, and from previous experiments, at least one unknown tag.

Pass #5 identifies no new tags. The collision on channel 5 was unexpected, again indicating seven known tags and at least one unknown tag. Similar interpretations can be made from Pass #6 and Pass #7.

In Pass #8, tag 6 is identified. All other collisions were expected. There are now eight identified tags, the minimum number expected from previous passes. However, there could still be tags hidden in the collisions. For example, there could be a tag that chose channels 1, 0, 4, 6, 3, 1, 1, 5, and this tag would be hidden by other collisions. The probability that a tag would have this particular ID would be $1/8^8$ or $6\times10^{-8}$.

There could also be a tag that chose channels e.g., 2, 4, 4, 6, 5, 4, 5, 6, also with probability $6\times10^{-8}$. In all, with two collisions during Pass #1, three collisions during Pass #2, three collisions during Pass #3, one collision during Pass #4, two collisions during Pass #5, two collisions during Pass #6, three collisions during Pass #7, and three collisions during Pass #8, there are $2\times3\times3\times1\times2\times2\times3\times3=648$ possible hidden ID's, each with probability $6\times10^{-8}$, for a probability of an additional single hidden tag of $648/8^8=38.6\times10^{-6}$ (38.6 ppm). The probability of an additional two hidden tags would be even smaller, $648\cdot647/8^{16}=1.5\times10^{-9}$. The level of inventory confidence could be further improved in other embodiments by unscrambling the data and determining, for example, that the hidden tag would be associated with a tire or some other unexpected item when all the other items were grocery items.

The probability of a hidden tag can be reduced by allowing the experiment to keep running after it has identified the minimum number of expected tags based on collision information (in this case, 8 tags). By counting the number of collisions per pass, and knowing the probability of a hidden tag based on the number of channels per pass, the reader 100 can keep running passes until it has satisfied some confidence level or has run out of unique channel patterns (exhausted the ID). Assuming $648^{1/8}=2.246$ collisions per pass, after two additional passes (10 total passes), the probability of a single hidden tag is reduced to $3.04\times10^{-6}$. After two more additional passes (12 total), the probability of a single hidden tag is reduced to $240\times10^{-9}$. Each additional pass reduces the probability of a single hidden tag as a geometric progression by roughly $648^{1/8}/8=0.281\times$.

A flow chart showing the steps involved in the no-interference cancellation method described above appears in FIG. 22. At the start 2210, the system is initialized with no positive ID's and no unknowns, which together corresponds to a total of zero items. After the analysis 2230 of the first pass 2220, positive ID's (e.g., items 1, 3, 5 and 7 in Pass #1) are recorded and added 2240 to the list of positive ID's. The number of collisions in the pass 2250 is also recorded (e.g., two collisions in Pass #1). If the collisions were anticipated 2260, then there are potential unknowns that may be revealed in future passes but no definite unknowns. If the collisions were not anticipated 2270, the two unknowns are added to the unknown list. The total number of items is then estimated 2280 to be the positively identified items and the minimum number of unknowns that could cause the recorded collisions. Assuming the positive ID's do not equal the estimated total items, the unknowns total is reset to zero 2295 and another pass 2220 is initiated. The loop is finally exited 2290 when the number of positive ID's equals the maximum number of previously identified ID's plus unknowns, and a predetermined confidence level 2296 is satisfied.

So far, no assumptions have been made about the time variations of the channel and the received signal levels. The "no collision mitigation method" can be applied whether the channel is static or dynamic. For the case of static channel conditions, where the return signals have a consistent power level and phase, more information is available at the reader 100 in the form of received signal level. If it is now assumed that, in addition to knowing what channel a known tag will choose on future passes, its signal level is also known, then it can be determined whether there are additional hidden tags in expected collisions. For example, the collision on channel 0 during Pass #2 contained two known tags and one unknown tag. If the signal levels of the known tags were also known, then the total signal level of the collision could be compared to the individual signal levels to determine if there was an additional unknown tag concealed in the collision. Such an environment would allow the reader 100 to terminate its inquiry after all tags had been independently identified (in this case, 8 passes) with certainty that there were no hidden tags because all collisions would be accounted for.

Knowledge of the signal level of identified tags thus offers a greater confidence in the accounting of the inventory. However, the signal level information affords improvements in acquisition time beyond merely terminating the inquiry after all known tags appear individually. This is discussed in the next section.

Forward Collision Mitigation Example

When a tag is individually identified, its channel choices for all subsequent passes are known at the reader 100. If the signal level and phase of the tag are additionally known, then the contributions of that tag to collisions can be nullified. The signal from the tag can essentially be removed from subsequent collisions, thereby effectively removing it from the population. Consider the experiment shown in FIG. 23. Tags 1, 3, 5 and 7 are positively identified during Pass #1. Assume their signal levels and phases are also determined.

During Pass #2, tags 1 and 5 are known to transmit their data over channel 0. With their known signal level, they can be subtracted out, leaving behind only tag 4 that can now be identified. Likewise, tag 7 was expected to transmit its data over channel 4 during Pass #2, and by canceling out this tag, tag 6 is left alone to be identified. There is still an unresolved collision on channel 1, so at least one other pass through the algorithm is required.

During Pass #3, tag 2 shows up by itself and is identified. Tag 1 was expected to transmit its data over channel 3, so it is subtracted out, leaving behind only tag 8, which can now be identified. All other collisions contain only known tags, so the accounting of the tags has been completed in three passes through the algorithm with full confidence instead of eight or more passes (depending on the confidence level required) for no collision mitigation as in FIG. 21.

For a coherent static channel, the signal strength of identified tags can be known to a high precision. Consider the case of an augmented PN channel. For this experiment, the tags would choose different code phases of an eight-chip long augmented PN sequence. This eight-chip long PN sequence would be transmitted either true or inverted for each bit of the tag's ID, depending on the sense of the particular ID bit. At the reader 100, the correlator in the receiver would essentially average the signal level over the eight chips per bit. This would be done for all bits (e.g., 128) in the ID, giving an average over 8×128=1024 samples, for a signal to noise ratio averaging gain of 10 log(1024)=30 dB. For more practical cases where there are many more expected tags and many more channels available (>32), the gain increases. For 32 channels and 128 bits, a gain in signal-to-noise ratio of 36 dB results.

Bi-Directional Collision Mitigation Example

Even greater improvements in accounting time can be made if the reader 100 stores waveform samples from previous passes. With a stored waveform, previous passes can be revisited and treated as subsequent passes, from which previous collisions can be cancelled out. This is because once a tag is identified, not only are all subsequent activities known, but all previous channel choices and signal levels would also be known.

Consider the example shown in FIG. 24. During Pass #1, tags 1, 3, 5 and 7 are identified in both bit pattern and signal level and phase. As with forward collision mitigation, tag 4 can be identified in Pass #2 since the effects of tags 1 and 5 can be removed from the collision on channel 0. Likewise, removing the effects of tag 7 from the collision on channel 4 allows identification of tag 6. After Pass #2 and the application of forward collision mitigation, tags 1, 3, 4, 5, 6 and 7 are known.

Instead of needing the third pass, the results of Pass #1 may be revisited after applying forward collision mitigation. With tag 4 identified during Pass #2, it can be removed from channel 2 of the stored results of the first pass to resolve tag 8. With tag 6 identified during Pass #2, it can also be removed from channel 1 of the stored results of the first pass to resolve tag 2. In this case, only two passes are required to successfully identify all eight tags. The benefits of both forward and bi-directional collision mitigation become more significant when larger numbers of channels and tags are involved.

Thus, a one-way communications system utilizing a multiple pass transmission algorithm (preferably employing spread spectrum techniques) that offers superior performance (e.g., reading time and capacity) has been fully described. The incorporation of collision mitigation techniques, dynamic channel profiles, and power on ranges further improves system performance. The described communication system has many applications that are not limited to the preferred embodiment and actual examples detailed in the text. The present invention also has applications in two-way communications devices, actively powered user devices, and networked devices without departing from its essential characteristics (described in the claims below).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A communications method comprising the steps of:

activating a plurality of signal sources;

transmitting a synchronization event to said plurality of signal sources to cause said plurality of signal sources to simultaneously transmit data using the same modulation technique in response to said synchronization event, wherein said plurality of signal sources store identification data and transmit at least a portion of said stored identification data over a set of available transmission channels in accordance with a multiple pass transmission algorithm having at least one transmission pass, wherein said signal sources utilize portions of said stored identification data to determine said transmission channels in each pass of the multiple pass transmission algorithm; and demodulating the transmitted data from said plurality of signal sources.

2. The method of clam 1, wherein said synchronizing event is an absence of transmission of a carrier signal for a predetermined duration.

3. The method of claim 2, wherein each signal source in said plurality of signal sources is passively powered.

4. The method of claim 2, wherein said synchronizing event commences and terminates at a predetermined phase of the carrier signal.

5. The method of claim 4, wherein said predetermined phase of the carrier signal is a positive-going zero crossing.

6. The method of claim 1, wherein said plurality of signal sources transmit data upon detecting that the synchronizing event has completed.

7. The method of claim 1, wherein said synchronization event further causes said plurality of signal sources to change their power-on range.

8. The method of claim 1, wherein said synchronizing event is a presence of a carrier signal for a predetermined duration.

9. The method of claim 8, wherein each signal source in said plurality of signal sources is self-powered.

10. The method of claim 1, wherein the step of transmitting said synchronization event is performed using pulse width modulation.

11. The method of claim 10, wherein said pulse width modulation conveys information in addition to said synchronization event to said plurality of signal sources.

12. The method of claim 1, wherein said plurality of signal sources simultaneously transmit using a symbol clock derived from a carrier signal.

13. The method of claim 1, wherein each signal source in said plurality of signal sources simultaneously transmits using a locally generated symbol clock.

14. The method of claim 13, wherein said locally generated symbol clock commences at a predetermined phase based on said synchronization event.

15. The method of claim 13, wherein said locally generated symbol clock is derived from a carrier signal.

16. A communications system comprising:

a plurality of source devices each adapted for transmitting data; and at least one destination device adapted for activating said plurality of source devices, transmitting a synchronization event to said plurality of source devices to cause said plurality of source devices to simultaneously transmit data using the same modulation technique in response to said synchronization event, and demodulating the transmitted data from said plurality of signal sources, wherein said plurality of source devices are further adapted for storing identification data and transmitting at least a potion of said data over a set of available transmission channels in accordance with a multiple pass transmission algorithm having at least one transmission pass, wherein said source devices utilize portions of their stored identification data to determine their transmission channels in said multiple pass transmission algorithm.

17. The system of claim 16, wherein each said source device in said plurality of source devices is passively powered.

18. The system of claim 16, wherein said plurality of source devices are further adapted for transmitting data upon detecting that the synchronization event has completed.

19. The system of claim 16, wherein at least one source device in said plurality of source devices is self-powered.

20. The system of claim 16, wherein said at least one destination device is further adapted for transmitting said synchronization event using pulse width modulation.

21. The system of claim 16, wherein said plurality of source devices are further adapted for simultaneously transmitting data using a symbol clock derived from a carrier signal.

22. The system of claim 16, wherein said plurality of source devices are futher adapted for simultaneously transmitting data using a locally generated symbol clock.

23. The system of claim 22, wherein said locally generated symbol clock commences at a predetermined phase based on said synchronization event.

24. The system or claim 22, wherein said locally generated symbol clock is derived from a carrier signal.

* * * * *